(12) United States Patent
Da et al.

(10) Patent No.: US 11,470,648 B2
(45) Date of Patent: Oct. 11, 2022

(54) RANDOM ACCESS METHOD, BASE STATION AND USER EQUIPMENT

(71) Applicant: CHINA ACADEMY OF TELECOMMUNICATIONS TECHNOLOGY, Beijing (CN)

(72) Inventors: Ren Da, Beijing (CN); Bin Ren, Beijing (CN); Tony Ekpenyong, Beijing (CN); Zheng Zhao, Beijing (CN); Fangchen Cheng, Beijing (CN); Tie Li, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 84 days.

(21) Appl. No.: 16/633,563

(22) PCT Filed: Jul. 20, 2018

(86) PCT No.: PCT/CN2018/096452
§ 371 (c)(1),
(2) Date: Jan. 23, 2020

(87) PCT Pub. No.: WO2019/029340
PCT Pub. Date: Feb. 14, 2019

(65) Prior Publication Data
US 2020/0163124 A1 May 21, 2020

(30) Foreign Application Priority Data
Aug. 11, 2017 (CN) .......................... 201710687313.2

(51) Int. Cl.
*H04W 74/08* (2009.01)
(52) U.S. Cl.
CPC ... *H04W 74/0833* (2013.01); *H04W 74/0841* (2013.01)

(58) Field of Classification Search
CPC ..... H04W 72/04; H04W 74/00; H04W 74/08; H04W 74/0833; H04W 74/0841
See application file for complete search history.

(56) References Cited

U.S. PATENT DOCUMENTS

2013/0058301 A1 3/2013 Lee et al.
2013/0242730 A1\* 9/2013 Pelletier ................ H04L 1/0046
370/230
(Continued)

FOREIGN PATENT DOCUMENTS

| CN | 101505538 A | 8/2009 |
| CN | 104186010 A | 12/2014 |

(Continued)

OTHER PUBLICATIONS

Notification of Reason for Refusal from KR app. No. 10-2020-7006284, dated Jan. 7, 2021, with English translation from Global Dossier.

(Continued)

*Primary Examiner* — Kashif Siddiqui
(74) *Attorney, Agent, or Firm* — Ladas & Parry, LLP

(57) ABSTRACT

A random access method, a base station and a User Equipment (UE) are provided. A random access method applied to a base station side includes: receiving, by using a preconfigured first SubCarrier Spacing (SCS), a first random access preamble message transmitted by a UE when the base station instructs the UE to perform an initial access according to a contention-based random access mechanism; transmitting, by using a predetermined second SCS or a third SCS configured by a network, a first Random Access Response (RAR) message to the UE; receiving, by using a predetermined fourth SCS or a fifth SCS configured by the network, a first scheduling transmission message transmitted by the UE; and transmitting, by using a predetermined sixth (Continued)

SCS or a seventh SCS configured by the network, a first collision resolution message to the UE, to complete the initial access.

10 Claims, 5 Drawing Sheets

(56) References Cited

U.S. PATENT DOCUMENTS

| | | | |
|---|---|---|---|
| 2015/0256308 | A1 | 9/2015 | Ma et al. |
| 2017/0201968 | A1 | 7/2017 | Nam et al. |
| 2017/0208591 | A1 | 7/2017 | Rico Alvarino et al. |
| 2017/0230962 | A1* | 8/2017 | Park ................. H04L 1/1861 |
| 2018/0097672 | A1* | 4/2018 | Jung ................ H04W 56/0015 |
| 2019/0014571 | A1 | 1/2019 | Liu et al. |
| 2019/0044782 | A1* | 2/2019 | Zeng ................. H04L 27/2613 |

FOREIGN PATENT DOCUMENTS

| | | |
|---|---|---|
| CN | 106961746 A | 7/2017 |
| KR | 20170085006 A | 7/2017 |
| WO | 2016040290 A1 | 3/2016 |
| WO | 2017121212 A1 | 7/2017 |
| WO | 2017121620 A1 | 7/2017 |
| WO | 2017123045 A1 | 7/2017 |
| WO | 2017125049 A1 | 7/2017 |
| WO | 2017132985 A1 | 8/2017 |

OTHER PUBLICATIONS

"On Remaining System Information Delivery", R1-1711267, 3GPP TSG-RAN WG1 NR AdHoc #2, Qingdao, P.R. China, Jun. 27-30, 2017.
"Random Access Procedure in NR", R2-167568, 3GPP TSG-RAN WG2 #96, Reno, USA, Nov. 14-18, 2016.
First Office Action and Search Report from CN app. No. 201710687313.2, dated Mar. 3, 2020, with English translation from Global Dossier.
Office Action and search report from TW app. No. 107125450, dated Jan. 29, 2020, with machine English translation.
International Search Report from PCT/CN2018/096452, dated Sep. 27, 2018, with English translation from WIPO.
Written Opinion from the International Searching Authority from PCT/CN2018/096452, dated Sep. 27, 2018, with English translation from WIPO.
International Preliminary Report on Patentability from PCT/CN2018/096452, dated Feb. 11, 2020, with English translation from WIPO.
"Relation among NR-PBCH, SIBs and subcalls", R1-1708106, 3GPP TSG RAN WG1 Meeting #89, Hangzhou, P.R. China, May 15-19, 2017.
"4-step RACH procedure discussion", R1-1710636, 3GPP TSG RAN WG1 Meeting NR AH #2, Qingdao, China, Jun. 27-30, 2017.
"NR 4-Step Random Access Procedure", R1-1713282, 3GPP TSG RAN WG1 Meeting #90, Prague, Czech Republic, Aug. 21-25, 2017.
Notice of Reason for Refusal from JP app. No. 2020-529793, dated Aug. 17, 2021, with English translation from Global Dossier, all pages.
Notification of Reason for Refusal from KR app. No. 10-2020-7006284, dated Jul. 29, 2021, with English translation from Global Dossier, all pages.
"NR PBCH Design", R1-1710507, 3GPP TSG RAN WG1 Meeting Ad-hoc#2, Qingdao, P.R. China, Jun. 27-30, 2017, all pages.
"Relation among NR-PBCH, SIBs and subcells", R1-1711319, 3GPP TSG RAN WG1 Meeting Ad-hoc#2, Qingdao, P.R. China, Jun. 27-30, 2017, all pages.
"Further details on NR 4-step RA Procedure", R1-1712359, 3GPP TSG RAN WG1#90, Prague, Czechia, Aug. 21-25, 2017, all pages.
"Beam recovery request", R2-1706926, 3GPP TSG RAN WG1 Meeting NR Ad-hoc, Qingdao, P.R. China, Jun. 27-39, 2017, all pages.
Second Japanese Office Action for Japanese Patent Application 2020-529793, dated Apr. 19, 2022 and English translation provided by client.
"4-step RACH procedure," 3GPP TSG RAN WG1 Meeting #89, R1-1707933, Hangzhou, China, May 15-19, 2017, Agenda item: 7.1.1.4.2, Source: Samsung.
"Remaining minimum system information delivery," 3GPP TSG RAN WG1 Meeting NR#2, R1-1710265, Qingdao, P.R., China Jun. 27-30, 2017, Agenda Item: 5.1.1,2,4, Source: LG Electronics.

* cited by examiner

RANDOM ACCESS METHOD, BASE STATION AND USER EQUIPMENT

CROSS-REFERENCE TO RELATED APPLICATIONS

The present application is the U.S. national phase of PCT Application No. PCT/CN2018/096452 filed on Jul. 20, 2018, which claims a priority to Chinese patent application No. 201710687313.2 filed in China on Aug. 11, 2017, the disclosures of which are incorporated herein by reference in their entireties.

TECHNICAL FIELD

The present disclosure relates to the field of communication technology, in particular to a random access method, a base station and a User Equipment (UE).

BACKGROUND

Long Term Evolution (LTE) protocol employs a four-step random access mechanism, while a fifth Generation (5G) mobile communication system New Radio (NR) supports both a contention-based four-step random access mechanism and a contention-free three-step random access mechanism. Since UpLink (UL) and DownLink (DL) multi-beam operations are introduced in the 5G NR, and different parameters, such as SubCarrier Spacing (SCS) are supported in the 5G NR, it is necessary to consider a method of configuring SCS of a random access message in a 5G NR system.

Specifically, a contention-based four-step random access mechanism supported by the 5G NR is as shown in FIG. 1. An Msg.1 is transmitted in a Physical Random Access CHannel (PRACH), both Msg.2 and Msg.4 are transmitted in a Physical Downlink Shared CHannel (PDSCH), and an Msg.3 is transmitted in a Physical Uplink Shared CHannel (PUSCH).

When the UE initially selects a cell by means of a DL cell search process, the UE receives a PRACH configuration in ReMaining System Information (RMSI) and obtains, from the PRACH configuration, a parameter of the PRACH corresponding to the Msg.1, such as the SCS and the time-frequency resource. The PDSCH carrying the RMSI and a corresponding Physical Downlink Control CHannel (PDCCH) are transmitted by using the same SCS.

A contention-free three-step random access mechanism supported by the 5G NR is as shown in FIG. 2. The mechanism is different from related four-step random access mechanism in that a preamble employed for the random access Msg.1 is indicated by an Msg.0 directly, instead of being selected randomly by UE among a predetermined set of preambles.

Thus, it is necessary to consider a method of configuring SCSs of various messages in a random access procedure in the 5G communication system. However, current 5G standards merely specify that the SCS of Msg.1 is configured uniformly through the RMSI. There is no desirable solution to the SCS configuration of other messages in a random access procedure.

SUMMARY

Some embodiments of the present disclosure provide a random access method, a base station and a UE, in which respective SCSs applied to various messages in the random access procedure are predetermined or configured by a network, so as to solve the problem in the related art that the SCSs of various messages in the random access procedure cannot be determined.

In a first aspect, some embodiments of the present disclosure provide a random access method applied to a base station. The method includes: receiving, by using a preconfigured first SCS, a first random access preamble message transmitted by a UE when the base station instructs the UE to perform an initial access according to a contention-based random access mechanism; transmitting, by using a predetermined second SCS or a third SCS configured by a network, a first Random Access Response (RAR) message to the UE according to the first random access preamble message; receiving, by using a predetermined fourth SCS or a fifth SCS configured by the network, a first scheduling transmission message transmitted by the UE according to the first RAR message; and transmitting, by using a predetermined sixth SCS or a seventh SCS configured by the network, a first collision resolution message to the UE according to the first scheduling transmission message, to complete the initial access.

In the above solution, the predetermined second SCS is a SCS employed by a Physical Broadcast CHannel (PBCH) transmission, or a SCS employed by a transmission of ReMaining System Information (RMSI).

In the above solution, the third SCS configured by the network is carried in a PRACH configuration parameter in RMSI.

In the above solution, the predetermined fourth SCS is a SCS employed by a PBCH transmission, or a SCS employed by a transmission of RMSI.

In the above solution, the fifth SCS configured by the network is carried in a PRACH configuration parameter in RMSI, or carried in the first RAR message.

In the above solution, the predetermined sixth SCS is a SCS employed by a PBCH transmission, or a SCS employed by a transmission of RMSI, or a SCS applied to the first RAR message.

In the above solution, the seventh SCS configured by the network is carried in a PRACH configuration parameter in RMSI.

In the above solution, after the initial access is completed, the method further includes: transmitting, by using a preconfigured eighth SCS, a first random access preamble indication message to the UE when a UL of the UE is out of sync and the base station instructs the UE to perform an random access according to a contention-free random access mechanism; receiving, by using a preconfigured ninth SCS, a second random access preamble message transmitted by the UE according to the first random access preamble indication message; and transmitting, by using a SCS applied in the transmission of the first random access preamble indication message, a second RAR message to the UE according to the second random access preamble message, so as to complete the uplink synchronization.

In the above solution, after the initial random access is completed, the method further includes: receiving, by using a preconfigured first SCS, a third random access preamble message transmitted by the UE when the UL of the UE is out of sync and the base station instructs the UE to perform an random access according to a contention-based random access mechanism; transmitting, by using a SCS applied in transmission of RMSI, a third RAR message to the UE according to the third random access preamble message; receiving, by using a SCS applied in the reception of the first scheduling transmission message, a second scheduling transmission message transmitted by the UE according to the third RAR message; and transmitting, by using a SCS applied in the transmission of the first collision resolution message, a second collision resolution message to the UE according to the second scheduling transmission message, so as to complete the uplink synchronization.

In a second aspect, some embodiments of the present disclosure further provide a random access method applied to a base station. The method includes: transmitting, by using a pre-configured eighth SCS, a second random access preamble indication message to a UE when the base station instructs the UE to perform an initial access according to a contention-free random access mechanism; receiving, by using a pre-configured ninth SCS, a fourth random access preamble message transmitted by the UE according to the second random access preamble indication message; and transmitting, by using a predetermined tenth SCS or an eleventh SCS configured by a network, a fourth RAR message to the UE according to the fourth random access preamble message, to complete the initial access.

In the above solution, when the contention-free random access is used in a non-handover procedure, the predetermined tenth SCS is a SCS applied to the second random access preamble indication message transmitted by a source cell.

In the above solution, when the contention-free random access is used in a non-handover procedure, the eleventh SCS configured by the network is carried in a PRACH configuration parameter in the second random access preamble indication message.

In the above solution, when the contention-free random access is used in a cell handover procedure, the predetermined tenth SCS is a SCS applied to the second random access preamble indication message transmitted by a source cell, or a SCS of a Reference Signal (RS) of a target cell that triggers the handover procedure.

In the above solution, when the RS in the handover procedure is a synchronization signal block reference signal, the predetermined tenth SCS is a SCS of the synchronization signal block reference signal; when the RS in the handover procedure is a Channel State Information Reference Signal (CSI-RS), the predetermined tenth SCS is a SCS of the CSI-RS.

In the above solution, when the contention-free random access is used in a cell handover procedure, the eleventh SCS configured by the network is carried in a PRACH configuration parameter in the second random access preamble indication message.

In the above solution, after the initial access is completed, the method further includes: transmitting, by using a pre-configured eighth SCS, a third random access preamble indication message to the UE when the UL of the UE is out of sync and the base station instructs the UE to perform an random access according to a contention-free random access mechanism; receiving, by using a preconfigured ninth SCS, a fifth random access preamble message transmitted by the UE according to the third random access preamble indication message; and transmitting, by using a SCS applied in the transmission of the third random access preamble indication message, a fifth RAR message to the UE according to the fifth random access preamble message, so as to complete uplink synchronization.

In a third aspect, some embodiments of the present disclosure further provide a random access method applied to UE. The method includes: transmitting, by using a pre-configured first SCS, a first random access preamble message to a base station when the base station instructs the UE to perform an initial access according to a contention-based random access mechanism; receiving, by using a predetermined second SCS or a third SCS configured by a network, a first RAR message transmitted by the base station according to the first random access preamble message; transmitting, by using a predetermined fourth SCS or a fifth SCS configured by a network, a first scheduling transmission message to the base station according to the first RAR message; and receiving, by using a predetermined sixth SCS or a seventh SCS configured by the network, a first collision resolution message transmitted by the base station according to the first scheduling transmission message, so as to complete the initial access.

In the above solution, the predetermined second SCS is a SCS employed by a PBCH transmission, or a SCS employed by a transmission of RMSI.

In the above solution, the third SCS configured by the network is carried in a PRACH configuration parameter in the RMSI.

In the above solution, the predetermined fourth SCS is a SCS employed by a PBCH transmission, or a SCS employed by a transmission of RMSI.

In the above solution, the fifth SCS configured by the network is carried in a PRACH configuration parameter in the RMSI, or carried in the first RAR message.

In the above solution, the predetermined sixth SCS is a SCS employed by a PBCH transmission, a SCS employed by a transmission of RMSI, or a SCS applied to the first RAR message.

In the above solution, the seventh SCS configured by the network is carried in a PRACH configuration parameter in the RMSI.

In the above solution, after the initial access is completed, the method further includes: receiving, by using a preconfigured eighth SCS, a first random access preamble indication message transmitted by the base station when the UL of the UE is out of sync and the base station instructs the UE to perform an random access according to a contention-free random access mechanism; transmitting, by using a preconfigured ninth SCS, a second random access preamble message to the base station according to the first random access preamble indication message; and receiving, by using a SCS applied in the reception of the first random access preamble indication message, a second RAR message transmitted by the base station according to the second random access preamble message, so as to complete uplink synchronization.

In the above solution, after the initial random access is completed, the method further includes: transmitting, by using a preconfigured first SCS, a third random access preamble message to the base station when the UL of the UE is out of sync and the base station instructs the UE to perform an random access according to a contention-based random access mechanism; receiving, by using a SCS applied in transmission of RMSI, a third RAR message transmitted by the base station according to the third random access preamble message; transmitting, by using a SCS applied in the transmission of the first scheduling transmission message, a second scheduling transmission message to the base station according to the third RAR message; and receiving, by using a SCS applied in the reception of the first collision resolution message, a second collision resolution message transmitted by the base station according to the second scheduling transmission message, so as to complete uplink synchronization.

In a fourth aspect, some embodiments of the present disclosure further provide a random access method applied to UE. The method includes: receiving, by using a preconfigured eighth SCS, a second random access preamble indication message transmitted by a base station when the base station instructs the UE to perform an initial access according to a contention-free random access mechanism; transmitting, by using a pre-configured ninth SCS, a fourth random access preamble message to the base station according to the second random access preamble indication message; and receiving, by using a predetermined tenth SCS or an eleventh SCS configured by a network, a fourth RAR message transmitted by the base station according to the fourth random access preamble message, so as to complete the initial access.

In the above solution, when the contention-free random access is used in a non-handover procedure, the predetermined tenth SCS is a SCS applied to the second random access preamble indication message transmitted by a source cell.

In the above solution, when the contention-free random access is used in a non-handover procedure, the eleventh SCS configured by the network is carried in a PRACH configuration parameter in the second random access preamble indication message.

In the above solution, when the contention-free random access is used in a cell handover procedure, the predetermined tenth SCS is a SCS applied to the second random access preamble indication message transmitted by a source cell, or a SCS of a RS of a target cell that triggers the handover procedure.

In the above solution, when the RS in the handover procedure is a synchronization signal block reference signal, the predetermined tenth SCS is a SCS of the synchronization signal block reference signal; when the RS in the handover procedure is a CSI-RS, the predetermined tenth SCS is a SCS of the CSI-RS.

In the above solution, when the contention-free random access is used in a cell handover procedure, the eleventh SCS configured by the network is carried in a PRACH configuration parameter in the second random access preamble indication message.

In the above solution, after the initial access is completed, the method further includes: receiving, by using a preconfigured eighth SCS, a third random access preamble indication message transmitted by the base station when the UL of the UE is out of sync and the base station instructs the UE to perform an random access according to a contention-free random access mechanism; transmitting, by using a preconfigured ninth SCS, a fifth random access preamble message to the base station according to the third random access preamble indication message; and receiving, by using a SCS applied in the reception of the third random access preamble indication message, a fifth RAR message transmitted by the base station according to the fifth random access preamble message, so as to complete uplink synchronization.

In a fifth aspect, some embodiments of the present disclosure further provide a base station. The base station includes: a first message reception module, configured to receive, by using a pre-configured first SCS, a first random access preamble message transmitted by UE when the base station instructs the UE to perform an initial access according to a contention-based random access mechanism; a first message transmission module, configured to transmit, by using a predetermined second SCS or a third SCS configured by a network, a first RAR message to the UE according to the first random access preamble message; a second message reception module, configured to receive, by using a predetermined fourth SCS or a fifth SCS configured by a network, a first scheduling transmission message transmitted by the UE according to the first RAR message; and a second message transmission module, configured to transmit, by using a predetermined sixth SCS or a seventh SCS configured by a network, a first collision resolution message to the UE according to the first scheduling transmission message, so as to complete the initial access.

In a sixth aspect, some embodiments of the present disclosure further provide a base station. The base station includes: a seventh message transmission module, configured to transmit, by using a pre-configured eighth SCS, a second random access preamble indication message to UE when the base station instructs the UE to perform an initial access according to a contention-free random access mechanism; a sixth message reception module, configured to receive, by using a pre-configured ninth SCS, a fourth random access preamble message transmitted by the UE according to the second random access preamble indication message; and an eighth message transmission module, configured to transmit, by using a predetermined tenth SCS or an eleventh SCS configured by a network, a fourth RAR message to the UE according to the fourth random access preamble message, so as to complete the initial access.

In a seventh aspect, some embodiments of the present disclosure further provide UE. The UE includes: an eleventh message transmission module, configured to transmit, by using a pre-configured first SCS, a first random access preamble message to a base station when the base station instructs the UE to perform an initial access according to a contention-based random access mechanism; an eighth message reception module, configured to receive, by using a predetermined second SCS or a third SCS configured by a network, a first RAR message transmitted by the base station according to the first random access preamble message; a twelfth message transmission module, configured to transmit, by using a predetermined fourth SCS or a fifth SCS configured by a network, a first scheduling transmission message to the base station according to the first RAR message; and a ninth message reception module, configured to receive, by using a predetermined sixth SCS or a seventh SCS configured by a network, a first collision resolution message transmitted by the base station according to the first scheduling transmission message, so as to complete the initial access.

In an eighth aspect, some embodiments of the present disclosure further provide UE. The UE includes: a fourteenth message reception module, configured to receive, by using a pre-configured eighth SCS, a second random access preamble indication message transmitted by a base station when the base station instructs the UE to perform an initial access according to a contention-free random access mechanism; a sixteenth message transmission module, configured to transmit, by using a pre-configured ninth SCS, a fourth random access preamble message to the base station according to the second random access preamble indication message; and a fifteenth message reception module, configured to receive, by using a predetermined tenth SCS or an eleventh SCS configured by a network, a fourth RAR message transmitted by the base station according to the fourth random access preamble message, so as to complete the initial access.

In a ninth aspect, some embodiments of the present disclosure further provide a base station. The base station includes: a first memory, a first processor and a computer program stored in the first memory and configured to be executed by the first processor, wherein the first processor is configured to execute the computer program, to implement the following steps: receiving, by using pre-configured first SCS, a first random access preamble message transmitted by UE when the base station instructs the UE to perform an initial access according to a contention-based random access mechanism; transmitting, by using a predetermined second SCS or a third SCS configured by a network, a first RAR message to the UE according to the first random access preamble message; receiving, by using a predetermined fourth SCS or a fifth SCS configured by a network, a first scheduling transmission message transmitted by the UE according to the first RAR message; and transmitting, by using a predetermined sixth SCS or a seventh SCS configured by a network, a first collision resolution message to the UE according to the first scheduling transmission message, so as to complete the initial access.

In a tenth aspect, some embodiments of the present disclosure further provide a base station. The base station includes: a second memory, a second processor and a computer program stored in the second memory and configured to be executed by the second processor, where the second processor is configured to execute the computer program, to implement the following steps: transmitting, by using a pre-configured eighth SCS, a second random access preamble indication message to UE when the base station instructs the UE to perform an initial access according to a contention-free random access mechanism; receiving, by using a pre-configured ninth SCS, a fourth random access preamble message transmitted by the UE according to the second random access preamble indication message; and transmitting, by using a predetermined tenth SCS or an eleventh SCS configured by a network, a fourth RAR message to the UE according to the fourth random access preamble message, so as to complete the initial access.

In an eleventh aspect, some embodiments of the present disclosure further provide UE. The UE includes: a third memory, a third processor and a computer program stored in the third memory and configured to be executed by the third processor, where the third processor is configured to execute the computer program, to implement the following steps: transmitting, by using a pre-configured first SCS, a first random access preamble message to a base station when the base station instructs the UE to perform an initial access according to a contention-based random access mechanism; receiving, by using a predetermined second SCS or a third SCS configured by a network, a first RAR message transmitted by the base station according to the first random access preamble message; transmitting, by using a predetermined fourth SCS or a fifth SCS configured by a network, a first scheduling transmission message to the base station according to the first RAR message; and receiving, by using a predetermined sixth SCS or a seventh SCS configured by a network, a first collision resolution message transmitted by the base station according to the first scheduling transmission message, so as to complete the initial access.

In an eleventh aspect, some embodiments of the present disclosure further provide UE. The UE includes: a fourth memory, a fourth processor and a computer program stored in the fourth memory and configured to be executed by the fourth processor, where the fourth processor is configured to execute the computer program, to implement the following steps: receiving, by using a pre-configured eighth SCS, a second random access preamble indication message transmitted by a base station when the base station instructs the UE to perform an initial access according to a contention-free random access mechanism; transmitting, by using a pre-configured ninth SCS, a fourth random access preamble message to the base station according to the second random access preamble indication message; and receiving, by using a predetermined tenth SCS or an eleventh SCS configured by a network, a fourth RAR message transmitted by the base station according to the fourth random access preamble message, so as to complete the initial access.

In a twelfth aspect, some embodiments of the present disclosure further provide a computer readable storage medium storing therein a computer program, wherein the computer program is configured to be executed by a processor, to implement the following steps: receiving, by using pre-configured first SCS, a first random access preamble message transmitted by UE when the base station instructs the UE to perform an initial access according to a contention-based random access mechanism; transmitting, by using a predetermined second SCS or a third SCS configured by a network, a first RAR message to the UE according to the first random access preamble message; receiving, by using a predetermined fourth SCS or a fifth SCS configured by a network, a first scheduling transmission message transmitted by the UE according to the first RAR message; and transmitting, by using a predetermined sixth SCS or a seventh SCS configured by a network, a first collision resolution message to the UE according to the first scheduling transmission message, so as to complete the initial access.

In a thirteenth aspect, some embodiments of the present disclosure further provide a computer readable storage medium storing therein a computer program, wherein the computer program is configured to be executed by a processor, to implement the following steps: transmitting, by using a pre-configured eighth SCS, a second random access preamble indication message to UE when the base station instructs the UE to perform an initial access according to a contention-free random access mechanism; receiving, by using a pre-configured ninth SCS, a fourth random access preamble message transmitted by the UE according to the second random access preamble indication message; and transmitting, by using a predetermined tenth SCS or an eleventh SCS configured by a network, a fourth RAR message to the UE according to the fourth random access preamble message, so as to complete the initial access.

In a fourteenth aspect, some embodiments of the present disclosure further provide a computer readable storage medium storing therein a computer program, wherein the computer program is configured to be executed by a processor, to implement the following steps: transmitting, by using a pre-configured first SCS, a first random access preamble message to a base station when the base station instructs the UE to perform an initial access according to a contention-based random access mechanism; receiving, by using a predetermined second SCS or a third SCS configured by a network, a first RAR message transmitted by the base station according to the first random access preamble message; transmitting, by using a predetermined fourth SCS or a fifth SCS configured by a network, a first scheduling transmission message to the base station according to the first RAR message; and receiving, by using a predetermined sixth SCS or a seventh SCS configured by a network, a first collision resolution message transmitted by the base station according to the first scheduling transmission message, so as to complete the initial access.

In a fifteenth aspect, some embodiments of the present disclosure further provide a computer readable storage medium storing therein a computer program, wherein the computer program is configured to be executed by a processor, to implement the following steps: receiving, by using a pre-configured eighth SCS, a second random access preamble indication message transmitted by a base station when the base station instructs the UE to perform an initial access according to a contention-free random access mechanism; transmitting, by using a pre-configured ninth SCS, a fourth random access preamble message to the base station according to the second random access preamble indication message; and receiving, by using a predetermined tenth SCS or an eleventh SCS configured by a network, a fourth RAR message transmitted by the base station according to the fourth random access preamble message, so as to complete the initial access.

Some embodiments of the present disclosure have the following beneficial effects: according to some embodiments of the present disclosure, SCSs applied to various messages in the random access procedure may be predetermined or configured by a network, such that Msg.1 to Msg.4 in 5G NR contention-based random access mechanism may be configured with different SCSs, and Msg.0 to Msg.2 in 5G NR contention-free random access mechanism may be configured with different SCSs as well, so as to solve the problem in the related art that respective SCSs of various messages in the random access procedure cannot be determined, thereby ensuring a proper operation of 5G NR random access mechanism.

DETAILED DESCRIPTION

In order to make the technical problem to be solved, the technical solutions and advantages of the present disclosure clearer, specific embodiments will be described in detail below with reference to the drawings. In the following description, specific details such as specific configuration and component are provided merely to facilitate a comprehensive understanding of some embodiments of the present disclosure. Therefore, it should be appreciated by a person skilled in the art, various improvements and modifications may be made to the described embodiments without departing from the scope and spirit of the present disclosure. Further, for clarity and conciseness, descriptions of known function and construction are omitted.

It is understood, "one embodiment" or "an embodiment" mentioned throughout the specification means specific features, structures or characteristics related to the embodiment are included in at least one embodiment of the present disclosure. Therefore, "in one embodiment" or "in an embodiment" mentioned throughout the specification does not necessarily refer to the same embodiment. Additionally, these specific features, structures or characteristics may be combined in any suitable manner in one or more embodiments.

In various embodiments of the present disclosure, it is understood, the numbering of various processes is not intended to imply an execution sequence. The execution sequence of the processes should be determined in accordance with the functions and inherent logic thereof, and by no means constitutes any limitation as to the implementation of the embodiments of the present disclosure.

Additionally, the terms "system" and "network" are often interchangeable herein.

In the embodiments provided in this application, it is understood, expression "B corresponding to A" represents that B is associated with A and B may be determined according to A. however, it is further understood, B being determined according to A does not mean B is determined exclusively according to A, rather, B may be determined according to A and/or other information.

In specific, some embodiments of the present disclosure provide a random access method, a base station and UE, in which respective SCSs applied to various messages in the random access procedure are predetermined or configured by a network, so as to solve the problem in the related art that SCSs of various messages in the random access procedure cannot be determined.

Figure 1:
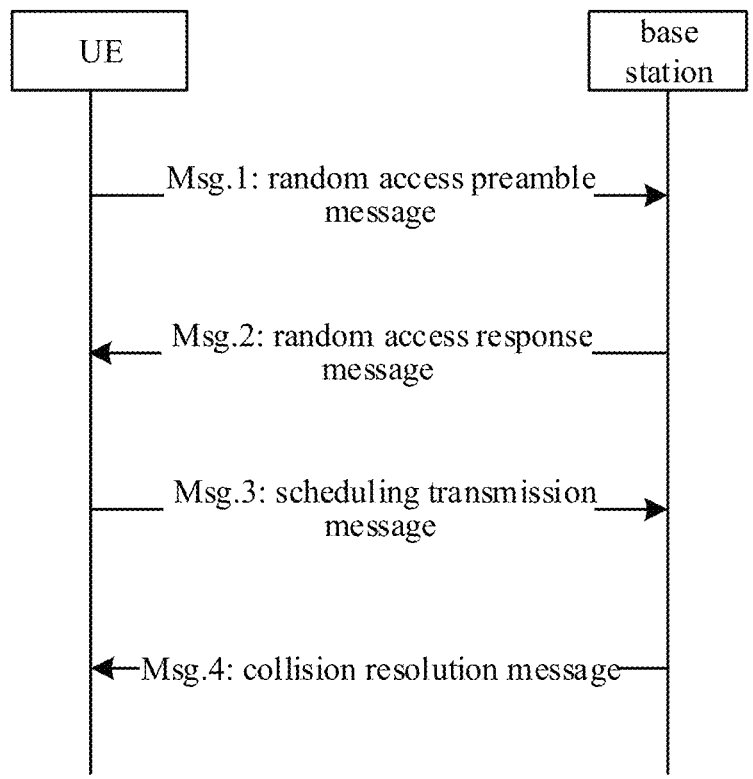
FIG. 1 illustrates a flow diagram of a contention-based four-step random access mechanism supported by 5G NR in the related art.
Figure 2:
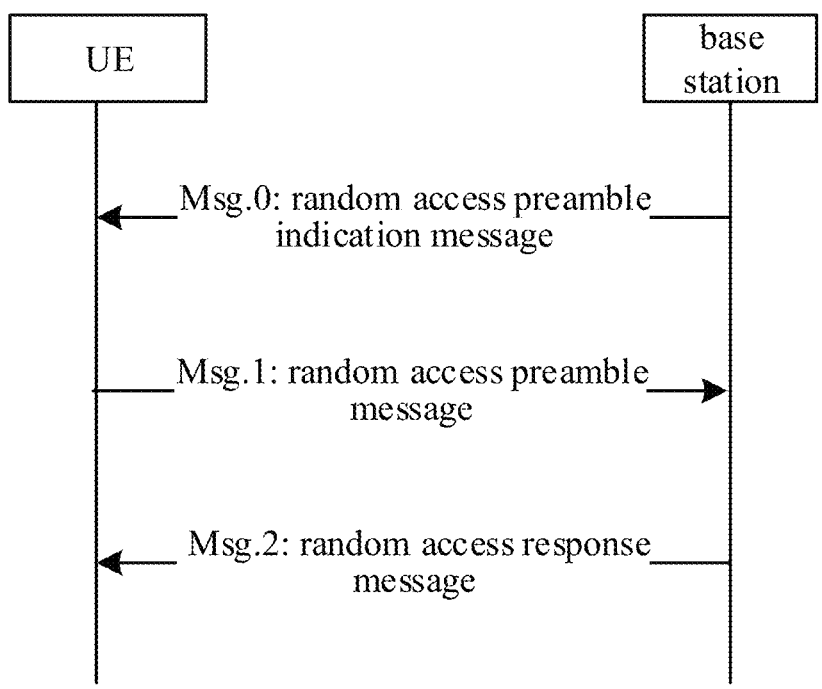
FIG. 2 illustrates a flow diagram of a contention-free three-step random access mechanism supported by 5G NR in the related art.
Figure 3:
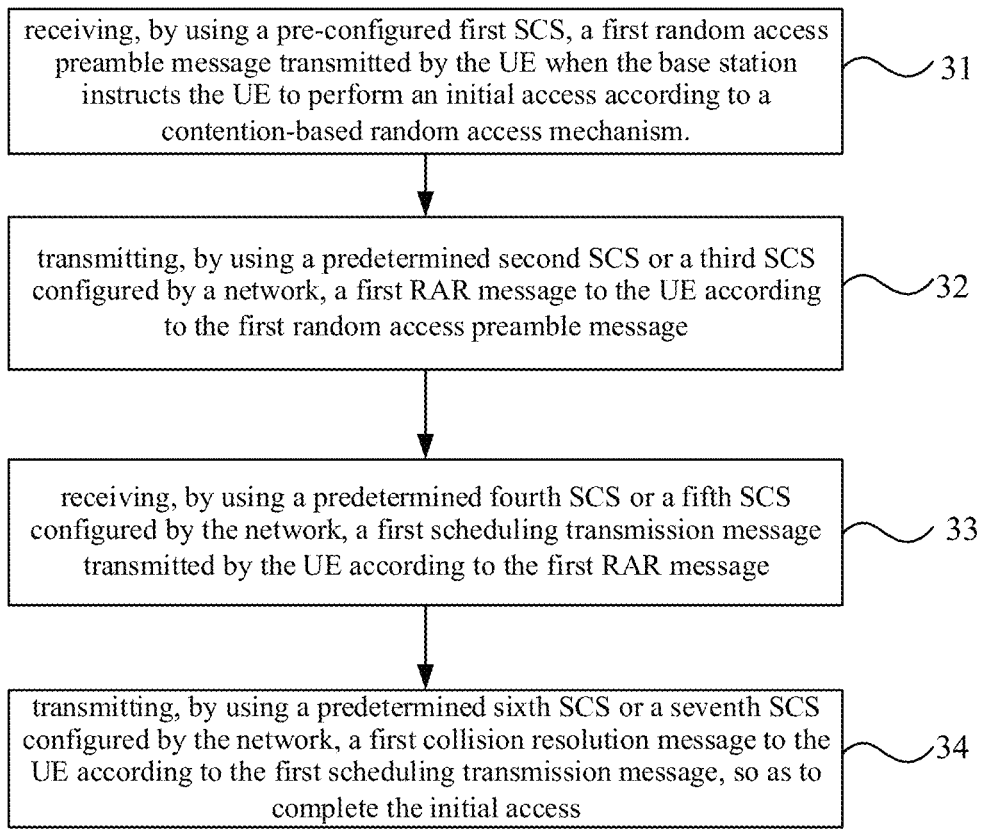
FIG. 3 illustrates a flow diagram of a contention-based random access method applied to a base station side according to some embodiments of the present disclosure.

As shown in FIG. 3, some embodiments of the present disclosure provide a random access method applied to a base station. The method specifically includes following step 31 to step 34.

The step 31 includes: receiving, by using a pre-configured first SCS, a first random access preamble message transmitted by UE when the base station instructs the UE to perform an initial access according to a contention-based random access mechanism.

Some embodiments of the present disclosure relate to a contention-based random access procedure performed by a base station side. When UE is to perform an initial access, the base station may instruct the UE on whether a contention-based random access or a contention-free random access is to be performed. In case that the base station instructs the UE to perform a contention-based random access, a preamble used by a random access preamble message (i.e., Msg.1) is selected randomly by the UE among a predefined set of preambles. In case that the base station instructs the UE to perform a contention-free random access, a preamble used by a random access preamble message (i.e., Msg.1) is a preamble indicated in a random access preamble indication message (i.e., Msg.0) transmitted by the base station to the UE.

Additionally, the pre-configured first SCS is configured uniformly through RMSI.

The step 32 includes: transmitting, by using a predetermined second SCS or a third SCS configured by a network, a first RAR message to the UE according to the first random access preamble message.

Optionally, the predetermined second SCS is a SCS employed by a PBCH transmission, or a SCS employed by a transmission of RMSI.

Optionally, the third SCS configured by the network is carried in a PRACH configuration parameter in the RMSI.

That is, when the base station instructs the UE to perform an initial access according to a contention-based random access mechanism, the SCS employed by the base station to transmit a RAR message (i.e., Msg.2) may be determined in the following three modes.

A first mode includes: the SCS employed for the Msg.2 is the same as the SCS employed by a PBCH transmission.

A second mode includes: the SCS employed for the Msg.2 is the same as the SCS employed by a transmission of RMSI.

A third mode includes: the SCS employed for the Msg.2 is configured in a PRACH configuration parameter in RMSI.

For the above three modes, when the base station designs Control-Resource Set (CORESET) used to search for PDCCH by taking account of RMSI, paging and RAR jointly, the SCS configuration of the Msg.2 is different from that of the PBCH, but is the same as the SCS employed by the transmission of RMSI. Further, the SCS configuration of the Msg.2 may be re-configured in the PRACH configuration parameter in RMSI according to actual network condition.

Further, since both the Msg.2 and the RMSI are carried in the PDSCH, the base station may configure same SCS as that of the PDSCH used to transmit the RMSI. In other words, optionally, the base station configures, by default, a SCS of Msg.2 to be the same as a SCS employed by the transmission of the RMSI, and thus it is unnecessary to transmit any signaling to inform the UE, leading to a reduction of signaling overhead. Further, if the base station determines that the SCS of Msg.2 is to be modified, the base station may indicate the SCS of the Msg.2 in the PRACH configuration parameter in the RMSI, thereby configuring the SCS of the Msg.2 flexibly; or UE may be informed by means of Radio Resource Control (RRC) high layer signaling or RMSI to employ same the SCS as that of the PBCH.

The step 33 includes: receiving, by using a predetermined fourth SCS or a fifth SCS configured by a network, a first scheduling transmission message transmitted by the UE according to the first RAR message.

Optionally, the predetermined fourth SCS is a SCS employed by a PBCH transmission, or a SCS employed by a transmission of RMSI.

Optionally, the fifth SCS configured by the network is carried in a PRACH configuration parameter in the RMSI, or carried in the first RAR message.

That is, when the base station instructs the UE to perform an initial access according to a contention-based random access mechanism, the SCS employed by the base station to transmit a scheduling transmission message (i.e., Msg.3) may be determined in the following four modes.

A first mode includes: the SCS employed for the Msg.3 is the same as the SCS employed by the PBCH transmission.

A second mode includes: the SCS employed for the Msg.3 is the same as the SCS employed by transmission of RMSI.

A third mode includes: the SCS employed for the Msg.3 is configured in a PRACH configuration parameter in the RMSI.

A fourth mode includes: the SCS employed for the Msg.3 is indicated by a parameter included in the Msg.2.

With respect to the four determination modes for Msg.3, further, the base station configures, by default, a SCS of Msg.3 to be the same as a SCS employed by the transmission of the RMSI, and thus it is unnecessary to transmit any signaling to inform the UE, leading to a reduction of signaling overhead. Furthermore, according to actual needs, the network should indicate the SCS of Msg.3 again in the PRACH configuration parameter in the RMSI, thereby configuring the SCS of Msg.3 flexibly; or the network should inform the UE to employ same SCS as that of PBCH by means of an RRC high layer signaling or RMSI; or the network should indicate the SCS of Msg.3 in a parameter included in the Msg.2.

The step 34 includes: transmitting, by using a predetermined sixth SCS or a seventh SCS configured by a network, a first collision resolution message to the UE according to the first scheduling transmission message, so as to complete the initial access.

Optionally, the predetermined sixth SCS is a SCS employed by a PBCH transmission, or a SCS employed by transmission of RMSI, or a SCS applied to the first RAR message.

Optionally, the seventh SCS configured by the network is carried in a PRACH configuration parameter in the RMSI.

That is, when the base station instructs the UE to perform an initial access according to a contention-based random access mechanism, the SCS employed by the base station to transmit a collision resolution message (i.e., Msg.4) may be determined in the following four modes.

A first mode includes: the SCS employed for the Msg.4 is the same as the SCS employed by the PBCH transmission.

A second mode includes: the SCS employed for the Msg.4 is the same as the SCS employed by the transmission of RMSI.

A third mode includes: the SCS employed for the Msg.4 is the same as that employed for the Msg.2.

A fourth mode includes: the SCS employed for the Msg.4 is configured in a PRACH configuration parameter in the RMSI.

With respect to the four determination modes for Msg.4, since both the Msg.2 and the Msg.4 are transmitted on the PDSCH, the base station further configures, by default, a SCS of Msg.4 to be the same as SCS of Msg.2, and thus it is unnecessary to transmit any signaling to inform the UE, leading to a reduction of signaling overhead.

Furthermore, according to actual needs, the network should indicate the SCS of Msg.4 again in the PRACH configuration parameter in the RMSI, thereby configuring the SCS of Msg.3 flexibly; or the network should inform the UE to employ same SCS as that of the PBCH or employ a SCS used for transmission of RMSI by means of an RRC high layer signaling or RMSI.

Optionally, after the initial access procedure is completed through the foregoing step 31 to step 34, the method further includes: transmitting, by using a preconfigured eighth SCS, a first random access preamble indication message to the UE when the UL of the UE is out of sync and the base station instructs the UE to perform an random access according to a contention-free random access mechanism; further, the eighth SCS is by default the SCS employed by a PBCH transmission; receiving, by using a preconfigured ninth SCS, a second random access preamble message transmitted by the UE according to the first random access preamble indication message; further, the ninth SCS is configured by the RMSI uniformly; and transmitting, by using a SCS applied in the transmission of the first random access preamble indication message, a second RAR message to the UE according to the second random access preamble message, so as to complete uplink synchronization.

Optionally, after the initial access procedure is completed through the foregoing step 31 to step 34, the method further includes: receiving, by using a preconfigured first SCS, a third random access preamble message transmitted by the UE when the UL of the UE is out of sync and the base station instructs the UE to perform an random access according to a contention-based random access mechanism; further, the first SCS is configured by the RMSI uniformly; transmitting, by using a SCS applied in transmission of the RMSI, a third RAR message to the UE according to the third random access preamble message; receiving, by using a SCS applied in the reception of the first scheduling transmission message, a second scheduling transmission message transmitted by the UE according to the third RAR message; and transmitting, by using a SCS applied in the transmission of the first collision resolution message, a second collision resolution message to the UE according to the second scheduling transmission message, so as to complete uplink synchronization.

After an RRC connection is established, one or more Band Width Parts (BWPs) employed by the UE may be configured by means of an RRC signaling. The SCS of each BWP may be configured by means of an RRC signaling as well. When an activated BWP uses a SCS being different from that of the RRC connection establishment procedure, in case that the UE loses uplink timing synchronization (i.e., the UL is out of sync), the behaviors of the UE in the random access procedure in connected state are to be specified. Regardless of whether one BWP or more than one BWP is configured, the SCS configuration for the PRACH is the same across different carriers.

If the UE loses UL synchronization, the UE releases all dedicated RRC configurations related to BWP and/or numerology. Once the network identifies the UE during the random access procedure, the network may re-configure one or more BWPs and/or numerologies for the UE.

If the UE performed the initial access according to a contention-based random access mechanism, when the UL of the UE is out of sync, the UE may perform a random access again according to a contention-based random access mechanism or a contention-free random access mechanism.

When the UL of the UE is out of sync and reconnects according to a contention-based random access mechanism, the network may not identify as to which UE has transmitted the Msg.1 in the PRACH. Thus, the UE monitors the Msg.2 scheduled by PDCCH in the CORESET. The CORESET is configured by Master Information Block (MIB) carried in the PBCH. Further, during this random access procedure, the SCS employed by the transmission of the RMSI is employed for Msg.2 by default, the SCS employed for the Msg.3 transmitted in the PUSCH is the same as that used in the initial access procedure, and the SCS employed for the Msg.4 is also the same as that used in the initial access procedure.

When the UL of the UE is out of sync and reconnects according to a contention-free random access mechanism, regardless of the configured value of BWP, the UE in connected state should at least configure a search space associated with the CORESET for monitoring a PDCCH command scheduling the PRACH transmission. Therefore, the PDCCH command and a corresponding PDCCH scheduling the Msg.2 may be monitored in the same search space, that is, the same SCS is used for the Msg.2 and the Msg.0.

Based on the PRACH configuration parameter provided in the RMSI, the PDCCH command in the Msg.0 indicates PRACH transmission parameters which include SCS of the Msg.1 and the like.

Additionally, once an RRC connection reestablishment for UL synchronization is completed successfully by means of the foregoing process (regardless of whether the reestablishment is according to a contention-based random access mechanism or not), the network may resume the scheduling of dedicated DL allocation in the configured BWP.

In summary, according to some embodiments of the present disclosure, respective SCSs applied to various messages in the random access procedure may be predetermined or configured by a network, such that Msg.1 to Msg.4 in 5G NR contention-based random access mechanism may be configured with different SCSs, and during a reconnection procedure in case that the UL of the UE is out of sync, SCSs of various messages in the reconnection procedure may be determined as well, so as to solve the problem in the related art that SCSs of various messages in the random access procedure cannot be determined, thereby ensuring a proper operation of 5G NR random access mechanism.

Figure 4:
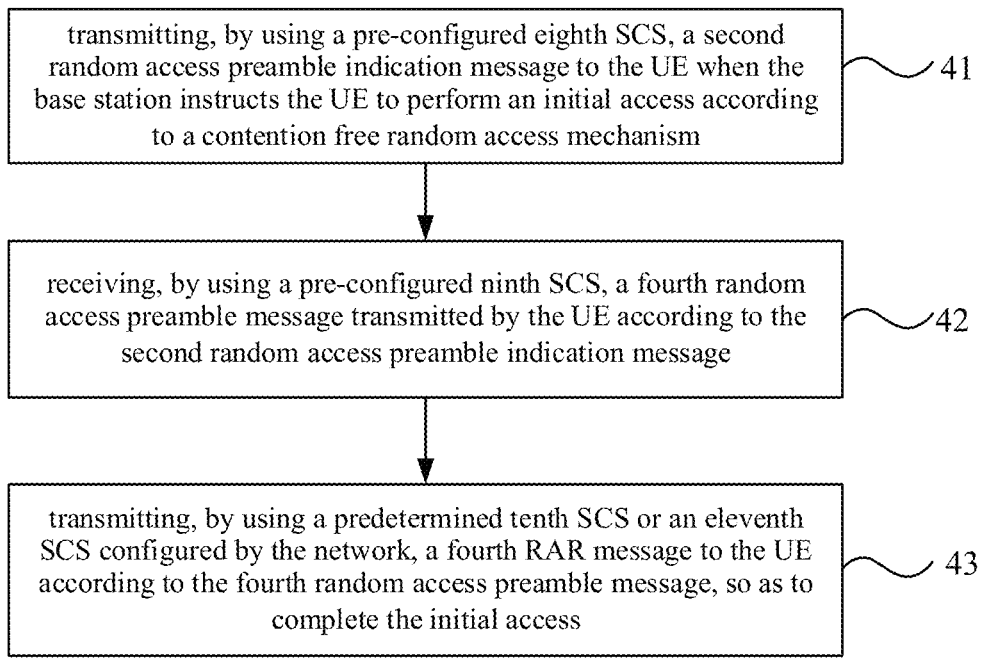
FIG. 4 illustrates a flow diagram of a contention-free random access method applied to a base station side according to some embodiments of the present disclosure.

As shown in FIG. 4, some embodiments of the present disclosure provide a random access method applied to a base station. The method includes step 41 to step 43.

The step 41 includes: transmitting, by using a pre-configured eighth SCS, a second random access preamble indication message to the UE when the base station instructs the UE to perform an initial access according to a contention-free random access mechanism.

Some embodiments of the present disclosure relate to a contention-free random access procedure performed by a base station side. When the UE is to perform an initial access, the base station instructs the UE on whether a contention-based random access or a contention-free random access is to be performed. In case that the base station instructs the UE to perform a contention-based random access, a preamble used by a random access preamble message (i.e., Msg.1) is selected randomly by the UE among a predefined set of preambles. In case that the base station instructs the UE to perform a contention-free random access, a preamble used by a random access preamble message (i.e., Msg.1) is a preamble indicated in a random access preamble indication message (i.e., Msg.0) transmitted by the base station to the UE.

Optionally, the eighth SCS is the same as the SCS employed by the PBCH transmission.

The step 42 includes: receiving, by using a pre-configured ninth SCS, a fourth random access preamble message transmitted by the UE according to the second random access preamble indication message.

The pre-configured ninth SCS is configured uniformly through RMSI.

The step 43 includes: transmitting, by using a predetermined tenth SCS or an eleventh SCS configured by a network, a fourth RAR message to the UE according to the fourth random access preamble message, so as to complete the initial access.

Optionally, when the contention-free random access is used in a non-handover procedure, the predetermined tenth SCS is a SCS applied to the second random access preamble indication message transmitted by a source cell.

Optionally, when the contention-free random access is used in a non-handover procedure, the eleventh SCS configured by the network is carried in a PRACH configuration parameter in the second random access preamble indication message.

That is, when the base station instructs the UE to perform an initial access according to a contention-free random access mechanism, if the random access is used in a non-handover procedure, the SCS employed by the base station to transmit a RAR message (i.e., Msg.2) may be determined in the following two modes.

A first mode includes: the SCS employed for the Msg.2 is the same as the SCS of the Msg.0 transmitted from the source cell.

A second mode includes: the SCS employed for the Msg.2 is configured in a PRACH configuration parameter in the Msg.0.

For the above two modes, further, if the contention-free random access is used in a non-handover procedure, the base station configures, by default, a SCS of Msg.2 to be the same as SCS of the Msg.0 transmitted from the source cell, and thus it is unnecessary to transmit any signaling to inform the UE, leading to a reduction of signaling overhead. If the base station determines that SCS of Msg.2 is to be modified, the base station may re-configure SCS of the Msg.2 in the PRACH configuration parameter in the Msg.0, thereby configuring the SCS of the Msg.2 flexibly.

Optionally, when the contention-free random access is used in a cell handover procedure, the predetermined tenth SCS is a SCS applied to the second random access preamble indication message transmitted by a source cell, or a SCS of a RS of a target cell that triggers the handover procedure.

Further, when the RS in the handover procedure is a synchronization signal block reference signal, the predetermined tenth SCS is a SCS of the synchronization signal block reference signal; when the RS in the handover procedure is a CSI-RS, the predetermined tenth SCS is a SCS of the CSI-RS.

Optionally, when the contention-free random access is used in a cell handover procedure, the eleventh SCS configured by the network is carried in a PRACH configuration parameter in the second random access preamble indication message.

That is, when the base station instructs the UE to perform an initial access according to a contention-free random access mechanism, if the random access is used in a handover procedure, the SCS employed by the base station to transmit a RAR message (i.e., Msg.2) may be determined in the following three modes.

A first mode includes: the SCS employed for the Msg.2 is the same as the SCS of the Msg.0 transmitted from the source cell.

A second mode includes: if the handover procedure is triggered by a Synchronization Signal block Reference Signal Received Power (SS-RSRP) measurement, the SCS of Msg.2 is the same as the SCS of the synchronization signal block reference signal used to measure the target cell; if the handover procedure is triggered by a Channel State Information Reference Signal Received Power (CSI-RSRP) measurement, the SCS of Msg.2 is the same as the SCS of the CSI-RS used to measure the target cell.

A second mode includes: the SCS employed for the Msg.2 is configured in a PRACH configuration parameter in the Msg.0.

For the above three modes, further, if the contention-free random access is used in a non-handover procedure, the base station determines, by default, that SCS of Msg.2 is the same as SCS of RS of the target cell that triggers the handover, thereby leading to a reduction of signaling overhead. Unless the PRACH configuration parameter in the Msg.0 is re-configured, thereby it may configures the SCS of the Msg.2 flexibly.

For the default case, if the handover procedure is triggered by a SS-RSRP measurement, the SCS of Msg.2 is the same as the SCS of the synchronization signal block reference signal used to measure the target cell; if the handover procedure is triggered by a CSI-RSRP measurement, the SCS of Msg.2 is the same as the SCS of the CSI-RS used to measure the target cell.

Optionally, after the initial access procedure is completed through the foregoing step 41 to step 43, the method further includes: transmitting, by using a preconfigured eighth SCS, a third random access preamble indication message to the UE when the UL of the UE is out of sync and the base station instructs the UE to perform an random access according to a contention-free random access mechanism; further, the eighth SCS is by default the SCS employed by the PBCH transmission; receiving, by using a preconfigured ninth SCS, a fifth random access preamble message transmitted by the UE according to the third random access preamble indication message; further, the ninth SCS is configured by RMSI uniformly; and transmitting, by using a SCS applied in the transmission of the third random access preamble indication message, a fifth RAR message to the UE according to the fifth random access preamble message, so as to complete uplink synchronization.

After an RRC connection is established, one or more BWPs used by the UE may be configured by means of a RRC signaling. The SCS of each BWP may be configured by means of an RRC signaling as well. When an activated BWP uses a SCS being different from that of the RRC connection establishment procedure, in case that the UE loses uplink timing synchronization (i.e., the UL is out of sync), the behaviors of the UE in the random access procedure in connected state are to be specified. Regardless of whether one BWP or more than one BWP is configured, the SCS configuration for PRACH is the same across different carriers.

If the UE loses UL synchronization, the UE releases all dedicated RRC configurations related to BWP and/or numerology. Once the network identifies the UE during the random access procedure, the network may re-configure one or more BWPs and/or numerologies for the UE.

If the UE performed the initial access according to a contention-free random access mechanism, when the UL of the UE is out of sync, the UE needs to perform a random access again according to a contention-free random access mechanism.

When the UL of the UE is out of sync and reconnects according to a contention-free random access mechanism, regardless of the configured value of BWP, the UE in connected state should at least configure a search space associated with the CORESET for monitoring a PDCCH command scheduling the PRACH transmission. Therefore, the PDCCH command and a corresponding PDCCH scheduling the Msg.2 may be monitored in the same search space, that is, the same SCS is used for the Msg.2 and the Msg.0. Based on the PRACH configuration parameter provided in the RMSI, the PDCCH command in the Msg.0 indicates PRACH transmission parameters which include SCS of the Msg.1 and the like.

Additionally, once an RRC connection reestablishment for UL synchronization is completed successfully by means of the foregoing process, the network may resume the scheduling of dedicated DL allocation in the configured BWP.

In summary, according to some embodiments of the present disclosure, SCSs applied to various messages in the random access procedure may be predetermined or configured by a network, such that Msg.0 to Msg.2 in 5G NR contention-free random access mechanism may be configured with different SCSs, and during a reconnection procedure in case that the UL of the UE is out of sync, SCSs applied to various messages in the reconnection procedure may be determined as well, so as to solve the problem in the related art that SCSs of various messages in the random access procedure cannot be determined, thereby ensuring a proper operation of 5G NR random access mechanism.

Figure 5:
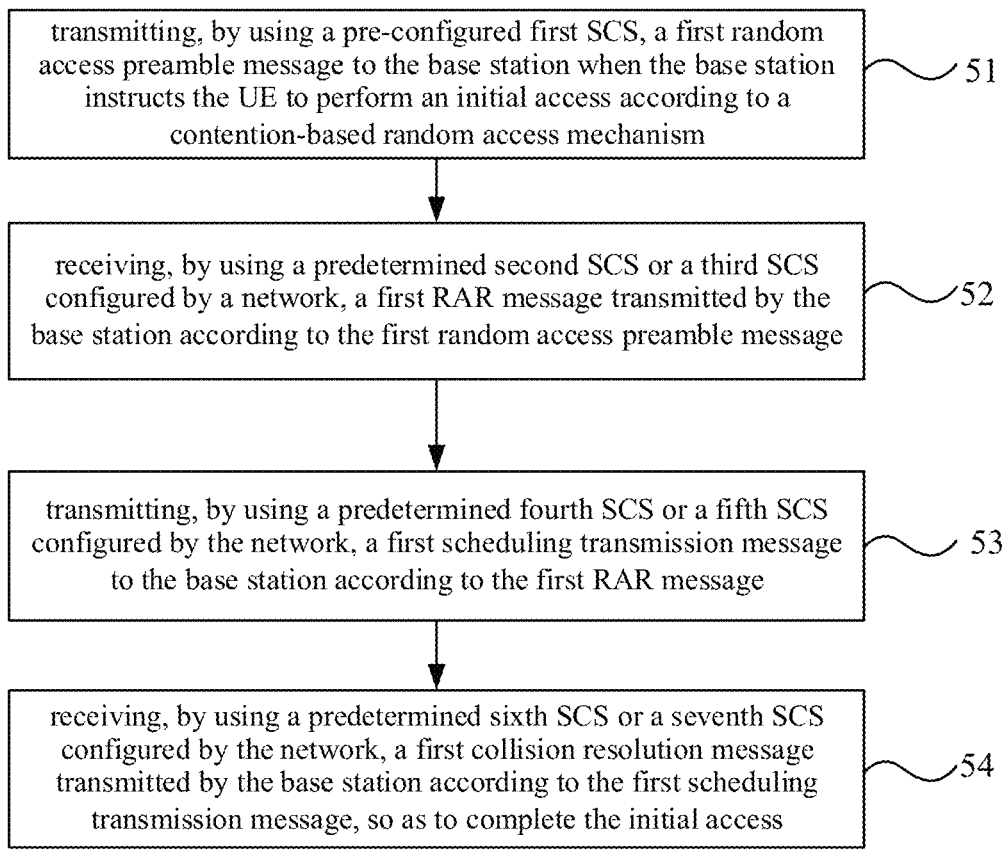
FIG. 5 illustrates a flow diagram of a contention-based random access method applied to a UE side according to some embodiments of the present disclosure.

As shown in FIG. 5, some embodiments of the present disclosure provide a random access method applied to UE. The method includes step 51 to step 54.

The step 51 includes: transmitting, by using a pre-configured first SCS, a first random access preamble message to a base station when the base station instructs the UE to perform an initial access according to a contention-based random access mechanism.

Some embodiments of the present disclosure relate to a contention-based random access procedure performed by a UE side. When the UE is to perform an initial access, the base station instructs the UE on whether a contention-based random access or a contention-free random access is to be performed. In case that the base station instructs the UE to perform a contention-based random access, a preamble used by a random access preamble message (i.e., Msg.1) is selected randomly by the UE among a predefined set of preambles. In case that the base station instructs the UE to perform a contention-free random access, a preamble used by a random access preamble message (i.e., Msg.1) is a preamble indicated in a random access preamble indication message (i.e., Msg.0) transmitted by the base station to the UE.

Additionally, the pre-configured first SCS is configured uniformly through RMSI.

The step 52 includes: receiving, by using a predetermined second SCS or a third SCS configured by a network, a first RAR message transmitted by the base station according to the first random access preamble message.

Optionally, the predetermined second SCS is a SCS employed by a PBCH transmission, or a SCS employed by a transmission of RMSI.

Optionally, the third SCS configured by the network is carried in a PRACH configuration parameter in the RMSI.

That is, when the base station instructs the UE to perform an initial access according to a contention-based random access mechanism, the SCS employed by the base station to transmit a RAR message (i.e., Msg.2) may be determined in the following three modes.

A first mode includes: the SCS employed for the Msg.2 is the same as the SCS employed by a PBCH transmission.

A second mode includes: the SCS employed for the Msg.2 is the same as the SCS employed by a transmission of RMSI.

A third mode includes: the SCS employed for the Msg.2 is configured in a PRACH configuration parameter in the RMSI.

For the above three modes, when the base station designs the CORESET used to search for the PDCCH by taking account of RMSI, paging and RAR jointly, the SCS configuration of the Msg.2 is different from that of the PBCH, but is the same as that employed by transmission of RMSI. Further, the SCS configuration of the Msg.2 may be re-configured in the PRACH configuration parameter in the RMSI according to actual network condition.

Further, since both the Msg.2 and RMSI are carried in PDSCH, the base station may configure same SCS as that of the PDSCH used to transmit RMSI. In other words, optionally, the base station configures, by default, a SCS of Msg.2 to be the same as a SCS employed by the transmission of the RMSI, and thus it is unnecessary to transmit any signaling to inform the UE, leading to a reduction of signaling overhead. Further, if the base station determines that SCS of Msg.2 is to be modified, the base station may indicate SCS of the Msg.2 in the PRACH configuration parameter in the RMSI, thereby configuring the SCS of the Msg.2 flexibly; or the UE may be informed by means of RRC high layer signaling or RMSI to employ same SCS as that of PBCH.

The step 53 includes: transmitting, by using a predetermined fourth SCS or a fifth SCS configured by a network, a first scheduling transmission message to the base station according to the first RAR message.

Optionally, the predetermined fourth SCS is a SCS employed by a PBCH transmission, or a SCS employed by transmission of RMSI.

Optionally, the fifth SCS configured by the network is carried in a PRACH configuration parameter in the RMSI, or carried in the first RAR message.

That is, when the base station instructs the UE to perform an initial access according to a contention-based random access mechanism, the SCS employed by the base station to transmit a scheduling transmission message (i.e., Msg.3) may be determined in the following four modes.

A first mode includes: the SCS employed for the Msg.3 is the same as the SCS employed by a PBCH transmission.

A second mode includes: the SCS employed for the Msg.3 is the same as the SCS employed by transmission of RMSI.

A third mode includes: the SCS employed for the Msg.3 is configured in a PRACH configuration parameter in the RMSI.

A fourth mode includes: the SCS employed for the Msg.3 is indicated by a parameter included in the Msg.2.

With respect to the four determination modes for Msg.3, further, the base station configures, by default, a SCS of Msg.3 to be the same as a SCS employed by the transmission of the RMSI, and thus it is unnecessary to transmit any signaling to inform the UE, leading to a reduction of signaling overhead. Furthermore, according to actual needs, the network should indicate the SCS of Msg.3 again in the PRACH configuration parameter in the RMSI, thereby configuring the SCS of Msg.3 flexibly; or the network should inform the UE to employ same SCS as that of PBCH by means of an RRC high layer signaling or RMSI; or the network should indicate the SCS of Msg.3 in a parameter included in the Msg.2.

The step 54 includes: receiving, by using a predetermined sixth SCS or a seventh SCS configured by a network, a first collision resolution message transmitted by the base station according to the first scheduling transmission message, so as to complete the initial access.

Optionally, the predetermined sixth SCS is a SCS employed by a PBCH transmission, a SCS employed by transmission of RMSI, or a SCS applied to the first RAR message.

Optionally, the seventh SCS configured by the network is carried in a PRACH configuration parameter in the RMSI.

That is, when the base station instructs the UE to perform an initial access according to a contention-based random access mechanism, the SCS employed by the base station to transmit a collision resolution message (i.e., Msg.4) may be determined in the following four modes.

A first mode includes: the SCS employed for the Msg.4 is the same as the SCS employed by a PBCH transmission.

A second mode includes: the SCS employed for the Msg.4 is the same as the SCS employed by transmission of RMSI.

A third mode includes: the SCS employed for the Msg.4 is the same as that employed for the Msg.2.

A fourth mode includes: the SCS employed for the Msg.4 is configured in a PRACH configuration parameter in the RMSI.

With respect to the four determination modes for Msg.4, since both the Msg.2 and the Msg.4 are transmitted on the PDSCH, the base station further configures, by default, a SCS of Msg.4 to be the same as SCS of Msg.2, and thus it is unnecessary to transmit any signaling to inform the UE, leading to a reduction of signaling overhead.

Furthermore, according to actual needs, the network should indicate the SCS of Msg.4 again in the PRACH configuration parameter in the RMSI, thereby configuring the SCS of Msg.3 flexibly; or the network should inform the UE to employ same SCS as that of PBCH or employ SCS used for transmission of RMSI by means of an RRC high layer signaling or RMSI.

Optionally, after the initial access procedure is completed through the foregoing step 51 to step 54, the method further includes: receiving, by using a preconfigured eighth SCS, a first random access preamble indication message transmitted by the base station when the UL of the UE is out of sync and the base station instructs the UE to perform an random access according to a contention-free random access mechanism; further, the eighth SCS is by default the SCS employed by a PBCH transmission; transmitting, by using a preconfigured ninth SCS, a second random access preamble message to the base station according to the first random access preamble indication message; further, the ninth SCS is configured by RMSI uniformly; and receiving, by using a SCS applied in the reception of the first random access preamble indication message, a second RAR message transmitted by the base station according to the second random access preamble message, so as to complete uplink synchronization.

Optionally, after the initial access procedure is completed through the foregoing step 51 to step 54, the method further includes: transmitting, by using a preconfigured first SCS, a third random access preamble message to the base station when the UL of the UE is out of sync and the base station instructs the UE to perform an random access according to a contention-based random access mechanism; further, the first SCS is configured by RMSI uniformly; receiving, by using a SCS applied in transmission of RMSI, a third RAR message transmitted by the base station according to the third random access preamble message; transmitting, by using a SCS applied in the transmission of the first scheduling transmission message, a second scheduling transmission message to the base station according to the third RAR message; and receiving, by using a SCS applied in the reception of the first collision resolution message, a second collision resolution message transmitted by the base station according to the second scheduling transmission message, so as to complete uplink synchronization.

After an RRC connection is established, one or more bandwidth parts (BWPs) employed by the UE may be configured by means of an RRC signaling. The SCS of each BWP may be configured by means of an RRC signaling as well. When an activated BWP uses a SCS being different from that of the RRC connection establishment procedure, in case that the UE loses uplink timing synchronization (i.e., the UL is out of sync), the behaviors of the UE in the random access procedure in connected state are to be specified. Regardless of whether one BWP or more than one BWP is configured, the SCS configuration for PRACH is the same across different carriers.

If the UE loses UL synchronization, the UE releases all dedicated RRC configurations related to BWP and/or numerology. Once the network identifies the UE during the random access procedure, the network may re-configure one or more BWPs and/or numerologies for the UE.

If the UE performs the initial access according to a contention-based random access mechanism, when the UL of the UE is out of sync, the UE may perform a random access again according to a contention-based random access mechanism or a contention-free random access mechanism.

When the UL of the UE is out of sync and reconnects according to a contention-based random access mechanism, the network may not identify as to which UE has transmitted the Msg.1 in the PRACH. Thus, the UE monitors the Msg.2 scheduled by PDCCH in the CORESET. The CORESET is configured by MIB carried in the PBCH. Further, during this random access procedure, the SCS employed by transmission of RMSI is employed for Msg.2 by default, the SCS employed for the Msg.3 transmitted on PUSCH is the same as that used in the initial access procedure, and the SCS employed for the Msg.4 is also the same as that used in the initial access procedure.

When the UL of the UE is out of sync and reconnects according to a contention-free random access mechanism, regardless of the configured value of BWP, the UE in connected state should at least configure a search space associated with the CORESET for monitoring a PDCCH command scheduling the PRACH transmission. Therefore, the PDCCH command and a corresponding PDCCH scheduling the Msg.2 may be monitored in the same search space, that is, the same SCS is used for the Msg.2 and the Msg.0. Based on the PRACH configuration parameter provided in the RMSI, the PDCCH command in the Msg.0 indicates PRACH transmission parameters which include SCS of the Msg.1 and the like.

Additionally, once an RRC connection reestablishment for UL synchronization is completed successfully by means of the foregoing process (regardless of whether the reestablishment is according to a contention-based random access mechanism or not), the network may resume the scheduling of dedicated DL allocation in the configured BWP.

In summary, according to some embodiments of the present disclosure, SCSs applied to various messages in the random access procedure may be predetermined or configured by a network, such that Msg.1 to Msg.4 in 5G NR contention-based random access mechanism may be configured with different SCSs, and during a reconnection procedure in case that the UL of the UE is out of sync, SCSs applied to various messages in the reconnection procedure may be determined as well, so as to solve the problem in the related art that SCSs of various messages in the random access procedure cannot be determined, thereby ensuring a proper operation of 5G NR random access mechanism.

Figure 6:
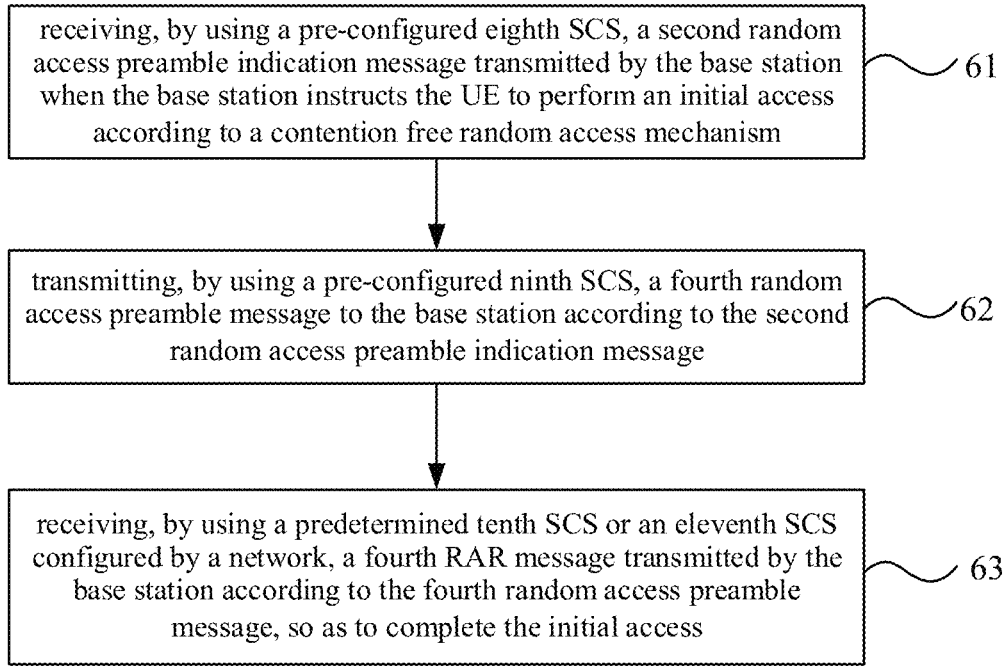
FIG. 6 illustrates a flow diagram of a contention-free random access method applied to a UE side according to some embodiments of the present disclosure.

As shown in FIG. 6, some embodiments of the present disclosure provide a random access method applied to a UE. The method includes step 61 to step 63.

The step 61 includes: receiving, by using a pre-configured eighth SCS, a second random access preamble indication message transmitted by a base station when the base station instructs the UE to perform an initial access according to a contention-free random access mechanism.

Some embodiments of the present disclosure relate to a contention-free random access procedure performed by a base station side. When the UE is to perform an initial access, the base station instructs the UE on whether a contention-based random access or a contention-free random access is to be performed. In case that the base station instructs the UE to perform a contention-based random access, a preamble used by a random access preamble message (i.e., Msg.1) is selected randomly by the UE among a predefined set of preambles. In case that the base station instructs the UE to perform a contention-free random access, a preamble used by a random access preamble message (i.e., Msg.1) is a preamble indicated in a random access preamble indication message (i.e., Msg.0) transmitted by the base station to the UE.

Optionally, the eighth SCS is the same as the SCS employed by the PBCH transmission.

The step 62 includes: transmitting, by using a pre-configured ninth SCS, a fourth random access preamble message to the base station according to the second random access preamble indication message.

The pre-configured ninth SCS is configured uniformly through RMSI.

The step 63 includes: receiving, by using a predetermined tenth SCS or an eleventh SCS configured by a network, a fourth RAR message transmitted by the base station according to the fourth random access preamble message, so as to complete the initial access.

Optionally, when the contention-free random access is used in a non-handover procedure, the predetermined tenth SCS is a SCS applied to the second random access preamble indication message transmitted by a source cell.

Optionally, when the contention-free random access is used in a non-handover procedure, the eleventh SCS configured by the network is carried in a PRACH configuration parameter in the second random access preamble indication message.

That is, when the base station instructs the UE to perform an initial access according to a contention-free random access mechanism, if the random access is used in a non-handover procedure, the SCS employed by the base station to transmit a RAR message (i.e., Msg.2) may be determined in the following two modes.

A first mode includes: the SCS employed for the Msg.2 is the same as the SCS of the Msg.0 transmitted from the source cell.

A second mode includes: the SCS employed for the Msg.2 is configured in a PRACH configuration parameter in the Msg.0.

For the above two modes, further, if the contention-free random access is used in a non-handover procedure, the base station configures, by default, a SCS of Msg.2 to be the same as SCS of the Msg.0 transmitted from the source cell, and thus it is unnecessary to transmit any signaling to inform the UE, leading to a reduction of signaling overhead. If the base station determines that SCS of Msg.2 is to be modified, the base station may re-configure SCS of the Msg.2 in the PRACH configuration parameter in the Msg.0, thereby configuring the SCS of the Msg.2 flexibly.

Optionally, when the contention-free random access is used in a cell handover procedure, the predetermined tenth SCS is a SCS applied to the second random access preamble indication message transmitted by a source cell, or a SCS of a RS of a target cell that triggers the handover procedure.

Further, when the RS in the handover procedure is a synchronization signal block reference signal, the predetermined tenth SCS is a SCS of the synchronization signal block reference signal; when the RS in the handover procedure is a CSI-RS, the predetermined tenth SCS is a SCS of the CSI-RS.

Optionally, when the contention-free random access is used in a cell handover procedure, the eleventh SCS configured by the network is carried in a PRACH configuration parameter in the second random access preamble indication message.

That is, when the base station instructs the UE to perform an initial access according to a contention-free random access mechanism, if the random access is used in a handover procedure, the SCS employed by the base station to transmit a RAR message (i.e., Msg.2) may be determined in the following three modes.

A first mode includes: the SCS employed for the Msg.2 is the same as the SCS of the Msg.0 transmitted from the source cell.

A second mode includes: if the handover procedure is triggered by a SS-RSRP measurement, the SCS of Msg.2 is the same as the SCS of the synchronization signal block reference signal used to measure the target cell; if the handover procedure is triggered by a CSI-RSRP measurement, the SCS of Msg.2 is the same as the SCS of the CSI-RS used to measure the target cell.

A second mode includes: the SCS employed for the Msg.2 is configured in a PRACH configuration parameter in the Msg.0.

For the above three modes, further, if the contention-free random access is used in a non-handover procedure, the base station determines, by default, that SCS of Msg.2 is the same as SCS of RS of the target cell that triggers the handover, thereby leading to a reduction of signaling overhead. Unless the PRACH configuration parameter in the Msg.0 is re-configured, thereby it may configure the SCS of the Msg.2 flexibly.

For the default case, if the handover procedure is triggered by a SS-RSRP measurement, the SCS of Msg.2 is the same as the SCS of the synchronization signal block reference signal used to measure the target cell; if the handover procedure is triggered by a CSI-RSRP measurement, the SCS of Msg.2 is the same as the SCS of the CSI-RS used to measure the target cell.

Optionally, after the initial access procedure is completed through the foregoing step 61 to step 63, the method further includes: receiving, by using a preconfigured eighth SCS, a third random access preamble indication message transmitted by the base station when the UL of the UE is out of sync and the base station instructs the UE to perform an random access according to a contention-free random access mechanism; transmitting, by using a preconfigured ninth SCS, a fifth random access preamble message to the base station according to the third random access preamble indication message; and receiving, by using a SCS applied in the reception of the third random access preamble indication message, a fifth RAR message transmitted by the base station according to the fifth random access preamble message, so as to complete uplink synchronization.

After an RRC connection is established, one or more BWPs used by the UE may be configured by means of a RRC signaling. The SCS of each BWP may be configured by means of an RRC signaling as well. When an activated BWP uses a SCS being different from that of the RRC connection establishment procedure, in case that the UE loses uplink timing synchronization (i.e., the UL is out of sync), the behaviors of the UE in the random access procedure in connected state are to be specified. Regardless of whether one BWP or more than one BWP is configured, the SCS configuration for PRACH is the same across different carriers.

If the UE loses UL synchronization, the UE releases all dedicated RRC configurations related to BWP and/or numerology. Once the network identifies the UE during the random access procedure, the network may re-configure one or more BWPs and/or numerologies for the UE.

If the UE performed the initial access according to a contention-free random access mechanism, when the UL of the UE is out of sync, the UE needs to perform a random access again according to a contention-free random access mechanism.

When the UL of the UE is out of sync and reconnects according to a contention-free random access mechanism, regardless of the configured value of BWP, the UE in connected state should at least configure a search space associated with the CORESET for monitoring a PDCCH command scheduling the PRACH transmission. Therefore, the PDCCH command and a corresponding PDCCH scheduling the Msg.2 may be monitored in the same search space, that is, the same SCS is used for the Msg.2 and the Msg.0. Based on the PRACH configuration parameter provided in the RMSI, the PDCCH command in the Msg.0 indicates PRACH transmission parameters which include SCS of the Msg.1 and the like.

Additionally, once an RRC connection reestablishment for UL synchronization is completed successfully by means of the foregoing process, the network may resume the scheduling of dedicated DL allocation in the configured BWP.

In summary, according to some embodiments of the present disclosure, SCSs applied to various messages in the random access procedure may be predetermined or configured by a network, such that Msg.0 to Msg.2 in 5G NR contention-free random access mechanism may be configured with different SCSs, and during a reconnection procedure in case that the UL of the UE is out of sync, SCSs of various messages in the reconnection procedure may be determined as well, so as to solve the problem in the related art that SCSs of various messages in the random access procedure cannot be determined, thereby ensuring a proper operation of 5G NR random access mechanism.

It should be appreciated that the foregoing first to fourth embodiments include: a contention-based initial random access procedure followed by a contention-free random access procedure when the UL of the UE is out of sync and a contention-based random access procedure when the UL of the UE is out of sync; a contention-free random access procedure followed by a contention-free random access procedure when the UL of the UE is out of sync. To distinguish among various messages of the different procedures, messages of the same kind are named differently.

That is, each of the "first random access preamble message", "second random access preamble message", "third random access preamble message", "fourth random access preamble message" and "fifth random access preamble message" appearing in the foregoing description may refer to Msg.1; each of the "first RAR message", "second RAR message", "third RAR message", "fourth RAR message" and "fifth RAR message" appearing in the foregoing description may refer to Msg.2; each of the "first scheduling transmission message" and the "second scheduling transmission message" appearing in the foregoing description may refer to Msg.3; each of the "first collision resolution message" and the "second collision resolution message" appearing in the foregoing description may refer to Msg.4; each of the "first random access preamble indication message", "second random access preamble indication message" and "third random access preamble indication message" appearing in the foregoing description may refer to Msg.0.

Figure 7:
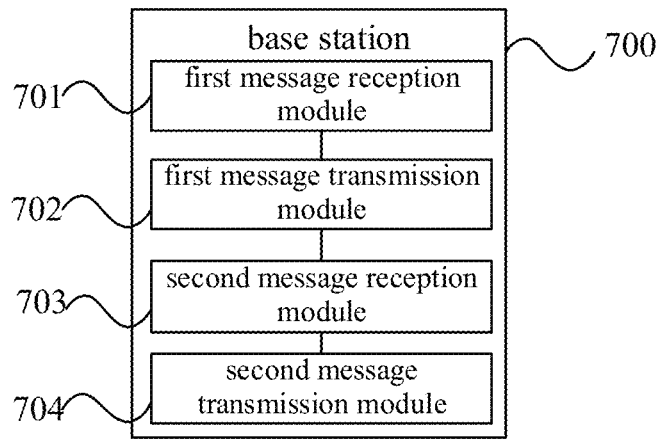
FIG. 7 illustrates a schematic module diagram of a base station according to some embodiments of the present disclosure.

Some embodiments of the present disclosure provide a base station. As shown in FIG. 7, the base station 700 includes: a first message reception module 701, configured to receive, by using a pre-configured first SCS, a first random access preamble message transmitted by UE when the base station instructs the UE to perform an initial access according to a contention-based random access mechanism; a first message transmission module 702, configured to transmit, by using a predetermined second SCS or a third SCS configured by a network, a first RAR message to the UE according to the first random access preamble message; a second message reception module 703, configured to receive, by using a predetermined fourth SCS or a fifth SCS configured by a network, a first scheduling transmission message transmitted by the UE according to the first RAR message; and a second message transmission module 704, configured to transmit, by using a predetermined sixth SCS or a seventh SCS configured by a network, a first collision resolution message to the UE according to the first scheduling transmission message, so as to complete the initial access.

Optionally, the predetermined second SCS is a SCS employed by a PBCH transmission, or a SCS employed by a transmission of RMSI.

Optionally, the third SCS configured by the network is carried in a PRACH configuration parameter in the RMSI.

Optionally, the predetermined fourth SCS is a SCS employed by a PBCH transmission, or a SCS employed by transmission of RMSI.

Optionally, the fifth SCS configured by the network is carried in a PRACH configuration parameter in the RMSI, or carried in the first RAR message.

Optionally, the predetermined sixth SCS is a SCS employed by a PBCH transmission, a SCS employed by transmission of RMSI, or a SCS applied to the first RAR message.

Optionally, the seventh SCS configured by the network is carried in a PRACH configuration parameter in the RMSI.

Optionally, after the initial access procedure is completed, the base station further includes: a third message transmission module, configured to transmit, by using a preconfigured eighth SCS, a first random access preamble indication message to the UE when the UL of the UE is out of sync and the base station instructs the UE to perform an random access according to a contention-free random access mechanism; a third message reception module, configured to receive, by using a preconfigured ninth SCS, a second random access preamble message transmitted by the UE according to the first random access preamble indication message; and a fourth message transmission module, configured to transmit, by using a SCS applied in the transmission of the first random access preamble indication message, a second RAR message to the UE according to the second random access preamble message, so as to complete uplink synchronization.

Optionally, after the initial random access procedure is completed, the base station further includes: a fourth message reception module, configured to receive, by using a preconfigured first SCS, a third random access preamble message transmitted by the UE when the UL of the UE is out of sync and the base station instructs the UE to perform an random access according to a contention-based random access mechanism; a fifth message transmission module, configured to transmit, by using a SCS applied in transmission of RMSI, a third RAR message to the UE according to the third random access preamble message; a fifth message reception module, configured to receive, by using a SCS applied in the reception of the first scheduling transmission message, a second scheduling transmission message transmitted by the UE according to the third RAR message; and a sixth message transmission module, configured to transmit, by using a SCS applied in the transmission of the first collision resolution message, a second collision resolution message to the UE according to the second scheduling transmission message, so as to complete uplink synchronization.

It can be seen from above, according to some embodiments of the present disclosure, SCSs applied to various messages in the random access procedure may be predetermined or configured by a network, such that Msg.1 to Msg.4 in 5G NR contention-based random access mechanism may be configured with different SCSs, so as to solve the problem in the related art that SCSs of various messages in the random access procedure cannot be determined, thereby ensuring a proper operation of 5G NR random access mechanism.

Figure 8:
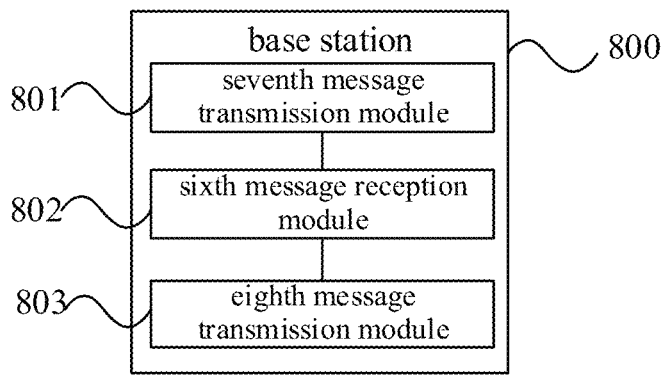
FIG. 8 illustrates a schematic module diagram of another base station according to some embodiments of the present disclosure.

Some embodiments of the present disclosure provide a base station. As shown in FIG. 8, the base station 800 includes: a seventh message transmission module 801, configured to transmit, by using a pre-configured eighth SCS, a second random access preamble indication message to the UE when the base station instructs the UE to perform an initial access according to a contention-free random access mechanism; a sixth message reception module 802, configured to receive, by using a pre-configured ninth SCS, a fourth random access preamble message transmitted by the UE according to the second random access preamble indication message; and an eighth message transmission module 803, configured to transmit, by using a predetermined tenth SCS or an eleventh SCS configured by a network, a fourth RAR message to the UE according to the fourth random access preamble message, so as to complete the initial access.

Optionally, when the contention-free random access is used in a non-handover procedure, the predetermined tenth SCS is a SCS applied to the second random access preamble indication message transmitted by a source cell.

Optionally, when the contention-free random access is used in a non-handover procedure, the eleventh SCS configured by the network is carried in a PRACH configuration parameter in the second random access preamble indication message.

Optionally, when the contention-free random access is used in a cell handover procedure, the predetermined tenth SCS is a SCS applied to the second random access preamble indication message transmitted by a source cell, or a SCS of a RS of a target cell that triggers the handover procedure.

Optionally, when the RS in the handover procedure is a synchronization signal block reference signal, the predetermined tenth SCS is a SCS of the synchronization signal block reference signal; when the RS in the handover procedure is a CSI-RS, the predetermined tenth SCS is a SCS of the CSI-RS.

Optionally, when the contention-free random access is used in a cell handover procedure, the eleventh SCS configured by the network is carried in a PRACH configuration parameter in the second random access preamble indication message.

Optionally, after the initial access procedure is completed, the base station further includes: a ninth message transmission module, configured to transmit, by using a preconfigured eighth SCS, a third random access preamble indication message to the UE when the UL of the UE is out of sync and the base station instructs the UE to perform an random access according to a contention-free random access mechanism; a seventh message reception module, configured to receive, by using a preconfigured ninth SCS, a fifth random access preamble message transmitted by the UE according to the third random access preamble indication message; and a tenth message transmission module, configured to transmit, by using a SCS applied in the transmission of the third random access preamble indication message, a fifth RAR message to the UE according to the fifth random access preamble message, so as to complete uplink synchronization.

It can be seen from above, according to some embodiments of the present disclosure, SCSs applied to various messages in the random access procedure may be predetermined or configured by a network, such that Msg.0 to Msg.2 in 5G NR contention-free random access mechanism may be configured with different SCSs, so as to solve the problem in the related art that SCSs of various messages in the random access procedure cannot be determined, thereby ensuring a proper operation of 5G NR random access mechanism.

Figure 9:
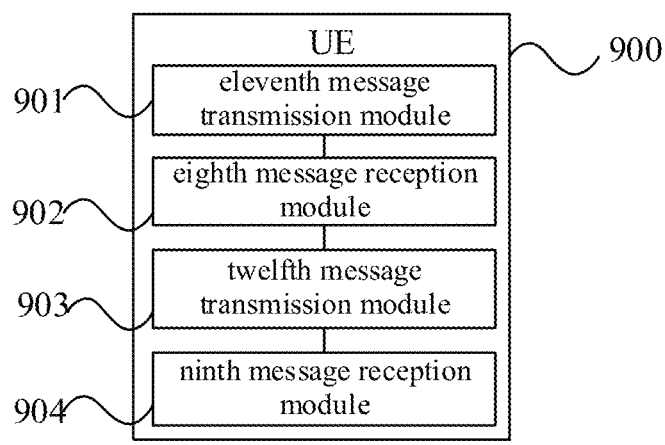
FIG. 9 illustrates a schematic module diagram of UE according to some embodiments of the present disclosure.

Some embodiments of the present disclosure provide a UE. As shown in FIG. 9, the UE 900 includes: an eleventh message transmission module 901, configured to transmit, by using a pre-configured first SCS, a first random access preamble message to a base station when the base station instructs the UE to perform an initial access according to a contention-based random access mechanism; an eighth message reception module 902, configured to receive, by using a predetermined second SCS or a third SCS configured by a network, a first RAR message transmitted by the base station according to the first random access preamble message; a twelfth message transmission module 903, configured to transmit, by using a predetermined fourth SCS or a fifth SCS configured by a network, a first scheduling transmission message to the base station according to the first RAR message; and a ninth message reception module 904, configured to receive, by using a predetermined sixth SCS or a seventh SCS configured by a network, a first collision resolution message transmitted by the base station according to the first scheduling transmission message, so as to complete the initial access.

Optionally, the predetermined second SCS is a SCS employed by a PBCH transmission, or a SCS employed by a transmission of RMSI.

Optionally, the third SCS configured by the network is carried in a PRACH configuration parameter in the RMSI.

Optionally, the predetermined fourth SCS is a SCS employed by a PBCH transmission, or a SCS employed by transmission of RMSI.

Optionally, the fifth SCS configured by the network is carried in a PRACH configuration parameter in the RMSI, or carried in the first RAR message.

Optionally, the predetermined sixth SCS is a SCS employed by a PBCH transmission, a SCS employed by transmission of RMSI, or a SCS applied to the first RAR message.

Optionally, the seventh SCS configured by the network is carried in a PRACH configuration parameter in the RMSI.

Optionally, after the initial access is completed, the UE further includes: a tenth message reception module, configured to receive, by using a preconfigured eighth SCS, a first random access preamble indication message transmitted by the base station when the UL of the UE is out of sync and the base station instructs the UE to perform an random access according to a contention-free random access mechanism; a thirteenth message transmission module, configured to transmit, by using a preconfigured ninth SCS, a second random access preamble message to the base station according to the first random access preamble indication message; and an eleventh message reception module, configured to receive, by using a SCS applied in the reception of the first random access preamble indication message, a second RAR message transmitted by the base station according to the second random access preamble message, so as to complete uplink synchronization.

Optionally, after the initial random access is completed, the UE further includes: a fourteenth message transmission module, configured to transmit, by using a preconfigured first SCS, a third random access preamble message to the base station when the UL of the UE is out of sync and the base station instructs the UE to perform an random access according to a contention-based random access mechanism; a twelfth message reception module, configured to receive, by using a SCS applied in transmission of RMSI, a third RAR message transmitted by the base station according to the third random access preamble message; a fifteenth message transmission module, configured to transmit, by using a SCS applied in the transmission of the first scheduling transmission message, a second scheduling transmission message to the base station according to the third RAR message; and a thirteenth message reception module, configured to receive, by using a SCS applied in the reception of the first collision resolution message, a second collision resolution message transmitted by the base station according to the second scheduling transmission message, so as to complete uplink synchronization.

It can be seen from above, according to some embodiments of the present disclosure, SCSs applied to various messages in the random access procedure may be predetermined or configured by a network, such that Msg.1 to Msg.4 in 5G NR contention-based random access mechanism may be configured with different SCSs, so as to solve the problem in the related art that SCSs of various messages in the random access procedure cannot be determined, thereby ensuring a proper operation of 5G NR random access mechanism.

Figure 10:
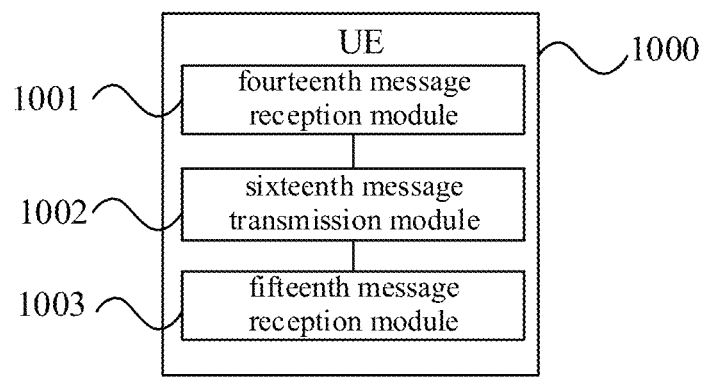
FIG. 10 illustrates a schematic module diagram of another UE according to some embodiments of the present disclosure.

Some embodiments of the present disclosure provide a UE. As shown in FIG. 10, the UE 1000 includes: a fourteenth message reception module 1001, configured to receive, by using a pre-configured eighth SCS, a second random access preamble indication message transmitted by a base station when the base station instructs the UE to perform an initial access according to a contention-free random access mechanism; a sixteenth message transmission module 1002, configured to transmit, by using a pre-configured ninth SCS, a fourth random access preamble message to the base station according to the second random access preamble indication message; and a fifteenth message reception module 1003, configured to receive, by using a predetermined tenth SCS or an eleventh SCS configured by a network, a fourth RAR message transmitted by the base station according to the fourth random access preamble message, so as to complete the initial access.

Optionally, when the contention-free random access is used in a non-handover procedure, the predetermined tenth SCS is a SCS applied to the second random access preamble indication message transmitted by a source cell.

Optionally, when the contention-free random access is used in a non-handover procedure, the eleventh SCS configured by the network is carried in a PRACH configuration parameter in the second random access preamble indication message.

Optionally, when the contention-free random access is used in a cell handover procedure, the predetermined tenth SCS is a SCS applied to the second random access preamble indication message transmitted by a source cell, or a SCS of a RS of a target cell that triggers the handover procedure.

Optionally, when the RS in the handover procedure is a synchronization signal block reference signal, the predetermined tenth SCS is a SCS of the synchronization signal block reference signal; when the RS in the handover procedure is a CSI-RS, the predetermined tenth SCS is a SCS of the CSI-RS.

Optionally, when the contention-free random access is used in a cell handover procedure, the eleventh SCS configured by the network is carried in a PRACH configuration parameter in the second random access preamble indication message.

Optionally, after the initial access is completed, the UE further includes: a sixteenth message reception module, configured to receive, by using a preconfigured eighth SCS, a third random access preamble indication message transmitted by the base station when the UL of the UE is out of sync and the base station instructs the UE to perform an random access according to a contention-free random access mechanism; a seventeenth message transmission module, configured to transmit, by using a preconfigured ninth SCS, a fifth random access preamble message to the base station according to the third random access preamble indication message; and a seventeenth message reception module, configured to receive, by using a SCS applied in the reception of the third random access preamble indication message, a fifth RAR message transmitted by the base station according to the fifth random access preamble message, so as to complete uplink synchronization.

According to some embodiments of the present disclosure, SCSs applied to various messages in the random access procedure may be predetermined or configured by a network, such that Msg.0 to Msg.2 in 5G NR contention-free random access mechanism may be configured with different SCSs, so as to solve the problem in the related art that SCSs of various messages in the random access procedure cannot be determined, thereby ensuring a proper operation of 5G NR random access mechanism.

Figure 11:
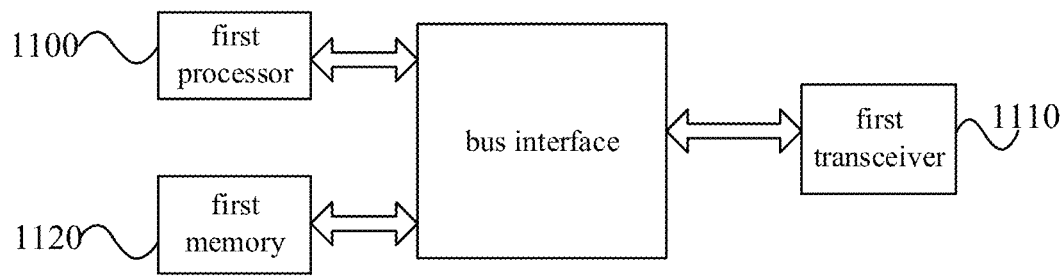
FIG. 11 illustrates a structural block diagram of a base station according to some embodiments of the present disclosure.

As shown in FIG. 11, some embodiments of the present disclosure provide a base station. The base station includes: a first memory 1120, a first processor 1100 and a computer program stored in the first memory 1120 and configured to be executed by the first processor, wherein the first processor 1100 is configured to read the computer program in the first memory 1120 to control a first transceiver 1110 to perform following steps when the base station instructs the UE to perform an initial access according to a contention-based random access mechanism: firstly, receiving, by using a pre-configured first SCS, a first random access preamble message transmitted by the UE; secondly, transmitting, by using a predetermined second SCS or a third SCS configured by a network, a first RAR message to the UE according to the first random access preamble message; thirdly, receiving, by using a predetermined fourth SCS or a fifth SCS configured by a network, a first scheduling transmission message transmitted by the UE according to the first RAR message; and finally, transmitting, by using a predetermined sixth SCS or a seventh SCS configured by a network, a first collision resolution message to the UE according to the first scheduling transmission message, so as to complete the initial access.

In FIG. 11, a bus architecture may include any number of interconnected buses and bridges, and connects various circuits including specifically one or more processors represented by the first processor 1100 and storages represented by the first memory 1120. The bus architecture may also connect various other circuits such as peripherals, voltage regulators and power management circuits, which is well known in the art. Therefore, a detailed description thereof is omitted herein. A bus interface are provided. The first transceiver 1110 may include multiple elements, i.e., including a transmitter and a transceiver, to allow for communication with various other devices on the transmission medium. The first processor 1100 is responsible for supervising the bus architecture and normal operation and the first memory 1120 may store the data being used by the first processor 1100 during operation.

The predetermined second SCS is a SCS employed by a PBCH transmission, or a SCS employed by a transmission of RMSI.

The third SCS configured by a network is carried in a PRACH configuration parameter in the RMSI.

The predetermined fourth SCS is a SCS employed by a PBCH transmission, or a SCS employed by transmission of RMSI.

The fifth SCS configured by a network is carried in a PRACH configuration parameter in the RMSI, or carried in the first RAR message.

The predetermined sixth SCS is a SCS employed by a PBCH transmission, a SCS employed by transmission of RMSI, or a SCS applied to the first RAR message.

The seventh SCS configured by the network is carried in a PRACH configuration parameter in the RMSI.

After the initial access procedure is completed, the first transceiver 1110 is further configured to: transmit, by using a preconfigured eighth SCS, a first random access preamble indication message to the UE when the UL of the UE is out of sync and the base station instructs the UE to perform an random access according to a contention-free random access mechanism; receive, by using a preconfigured ninth SCS, a second random access preamble message transmitted by the UE according to the first random access preamble indication message; and transmit, by using a SCS applied in the transmission of the first random access preamble indication message, a second RAR message to the UE according to the second random access preamble message, so as to complete uplink synchronization.

After the initial random access procedure is completed, the first transceiver 1110 is further configured to: receive, by using a preconfigured first SCS, a third random access preamble message transmitted by the UE when the UL of the UE is out of sync and the base station instructs the UE to perform an random access according to a contention-based random access mechanism; transmit, by using a SCS applied in transmission of RMSI, a third RAR message to the UE according to the third random access preamble message; receive, by using a SCS applied in the reception of the first scheduling transmission message, a second scheduling transmission message transmitted by the UE according to the third RAR message; and transmit, by using a SCS applied in the transmission of the first collision resolution message, a second collision resolution message to the UE according to the second scheduling transmission message, so as to complete uplink synchronization.

Further, according to another aspect of some embodiments of the present disclosure, the first processor 1100 is further configured to read the program in the first memory 1120 to control the first transceiver 1110 to perform following steps when the base station instructs the UE to perform an initial access according to a contention-free random access mechanism: firstly, transmitting, by using a pre-configured eighth SCS, a second random access preamble indication message to the UE; secondly, receiving, by using a pre-configured ninth SCS, a fourth random access preamble message transmitted by the UE according to the second random access preamble indication message; and finally, transmitting, by using a predetermined tenth SCS or an eleventh SCS configured by a network, a fourth RAR message to the UE according to the fourth random access preamble message, so as to complete the initial access.

When the contention-free random access is used in a non-handover procedure, the predetermined tenth SCS is a SCS applied to the second random access preamble indication message transmitted by a source cell.

When the contention-free random access is used in a non-handover procedure, the eleventh SCS configured by the network is carried in a PRACH configuration parameter in the second random access preamble indication message.

When the contention-free random access is used in a cell handover procedure, the predetermined tenth SCS is a SCS applied to the second random access preamble indication message transmitted by a source cell, or a SCS of a RS of a target cell that triggers the handover procedure.

When the RS in the handover procedure is a synchronization signal block reference signal, the predetermined tenth SCS is a SCS of the synchronization signal block reference signal; when the RS in the handover procedure is a CSI-RS, the predetermined tenth SCS is a SCS of the CSI-RS.

When the contention-free random access is used in a cell handover procedure, the eleventh SCS configured by the network is carried in a PRACH configuration parameter in the second random access preamble indication message.

After the initial access procedure is completed, the first transceiver 1110 is further configured to: transmit, by using a preconfigured eighth SCS, a third random access preamble indication message to the UE when the UL of the UE is out of sync and the base station instructs the UE to perform an random access according to a contention-free random access mechanism; receive, by using a preconfigured ninth SCS, a fifth random access preamble message transmitted by the UE according to the third random access preamble indication message; and transmit, by using a SCS applied in the transmission of the third random access preamble indication message, a fifth RAR message to the UE according to the fifth random access preamble message, so as to complete uplink synchronization.

Figure 12:
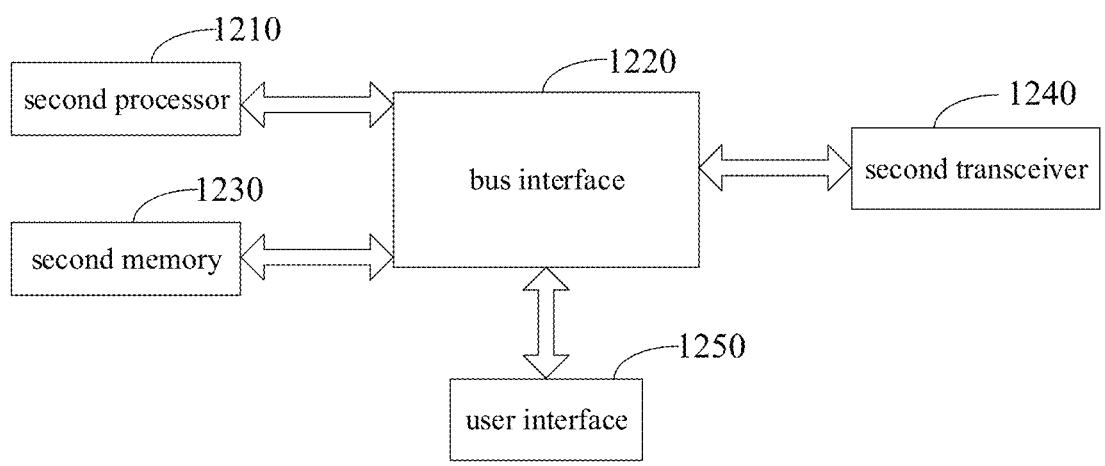
FIG. 12 illustrates a structural block diagram of a UE according to some embodiments of the present disclosure.

To achieve the abovementioned goal in a better manner, as shown in FIG. 12, the present disclosure further provides a UE. The UE includes: a second processor 1210; a second memory 1230 connected to the second processor 1210 via a bus interface 1220 and configured to store program and data being used by the second processor 1210 during operation; and a second transceiver 1240 connected to the second processor 1210 via the bus interface 1220 and configured to receive and transmit data under the control of the second processor 1210.

According to one aspect of some embodiments of the present disclosure, the second transceiver 1240 is configured to perform following steps when the base station instructs the UE to perform an initial access according to a contention-based random access mechanism: firstly, transmitting, by using a pre-configured first SCS, a first random access preamble message to a base station; secondly, receiving, by using a predetermined second SCS or a third SCS configured by a network, a first RAR message transmitted by the base station according to the first random access preamble message; thirdly, transmitting, by using a predetermined fourth SCS or a fifth SCS configured by a network, a first scheduling transmission message to the base station according to the first RAR message; and finally, receiving, by using a predetermined sixth SCS or a seventh SCS configured by a network, a first collision resolution message transmitted by the base station according to the first scheduling transmission message, so as to complete the initial access.

The predetermined second SCS is a SCS employed by a PBCH transmission, or a SCS employed by a transmission of RMSI.

The third SCS configured by a network is carried in a PRACH configuration parameter in the RMSI.

The predetermined fourth SCS is a SCS employed by a PBCH transmission, or a SCS employed by transmission of RMSI.

The fifth SCS configured by a network is carried in a PRACH configuration parameter in the RMSI, or carried in the first RAR message.

The predetermined sixth SCS is a SCS employed by a PBCH transmission, a SCS employed by transmission of RMSI, or a SCS applied to the first RAR message.

The seventh SCS configured by a network is carried in a PRACH configuration parameter in the RMSI.

After the initial access procedure is completed, the second transceiver 1240 is further configured to: receive, by using a preconfigured eighth SCS, a first random access preamble indication message transmitted by the base station when the UL of the UE is out of sync and the base station instructs the UE to perform an random access according to a contention-free random access mechanism; transmit, by using a preconfigured ninth SCS, a second random access preamble message to the base station according to the first random access preamble indication message; and receive, by using a SCS applied in the reception of the first random access preamble indication message, a second RAR message transmitted by the base station according to the second random access preamble message, so as to complete uplink synchronization.

After the initial random access procedure is completed, the second transceiver 1240 is further configured to: transmit, by using a preconfigured first SCS, a third random access preamble message to the base station when the UL of the UE is out of sync and the base station instructs the UE to perform an random access according to a contention-based random access mechanism; receive, by using a SCS applied in transmission of RMSI, a third RAR message transmitted by the base station according to the third random access preamble message; transmit, by using a SCS applied in the transmission of the first scheduling transmission message, a second scheduling transmission message to the base station according to the third RAR message; and receive, by using a SCS applied in the reception of the first collision resolution message, a second collision resolution message transmitted by the base station according to the second scheduling transmission message, so as to complete uplink synchronization.

According to another aspect of some embodiments of the present disclosure, the second transceiver 1240 is further configured to perform following steps when the base station instructs the UE to perform an initial access according to a contention-free random access mechanism: firstly, receiving, by using a pre-configured eighth SCS, a second random access preamble indication message transmitted by a base station; secondly, transmitting, by using a pre-configured ninth SCS, a fourth random access preamble message to the base station according to the second random access preamble indication message; and finally, receiving, by using a predetermined tenth SCS or an eleventh SCS configured by a network, a fourth RAR message transmitted by the base station according to the fourth random access preamble message, so as to complete the initial access.

When the contention-free random access is used in a non-handover procedure, the predetermined tenth SCS is a SCS applied to the second random access preamble indication message transmitted by a source cell.

When the contention-free random access is used in a non-handover procedure, the eleventh SCS configured by the network is carried in a PRACH configuration parameter in the second random access preamble indication message.

When the contention-free random access is used in a cell handover procedure, the predetermined tenth SCS is a SCS applied to the second random access preamble indication message transmitted by a source cell, or a SCS of a RS of a target cell that triggers the handover procedure.

When the RS in the handover procedure is a synchronization signal block reference signal, the predetermined tenth SCS is a SCS of the synchronization signal block reference signal; when the RS in the handover procedure is a CSI-RS, the predetermined tenth SCS is a SCS of the CSI-RS.

When the contention-free random access is used in a cell handover procedure, the eleventh SCS configured by the network is carried in a PRACH configuration parameter in the second random access preamble indication message.

After the initial access procedure is completed, the second transceiver 1240 is further configured to: receive, by using a preconfigured eighth SCS, a third random access preamble indication message transmitted by the base station when the UL of the UE is out of sync and the base station instructs the UE to perform an random access according to a contention-free random access mechanism; transmit, by using a preconfigured ninth SCS, a fifth random access preamble message to the base station according to the third random access preamble indication message; and receive, by using a SCS applied in the reception of the third random access preamble indication message, a fifth RAR message transmitted by the base station according to the fifth random access preamble message, so as to complete uplink synchronization.

It should be appreciated that in FIG. 12, a bus architecture may include any number of interconnected buses and bridges, and connects various circuits including specifically one or more processors represented by the second processor 1210 and storages represented by the second memory 1230. The bus architecture may also connect various other circuits such as peripherals, voltage regulators and power management circuits, which is well known in the art. Therefore, a detailed description thereof is omitted herein. A bus interface is provided. The second transceiver 1240 may include multiple elements, i.e., including a transmitter and a transceiver, to allow for communication with various other devices on the transmission medium. For different UEs, the user interface 1250 may also be an interface capable of externally/internally connecting the required devices, which including but not limited to a keypad, a display, a speaker, a microphone, a joystick, and the like. The second processor 1210 is responsible for supervising the bus architecture and normal operation and the second memory 1230 may store the data being used by the second processor 1210 during operation.

It is understood by a person skilled in the art that, all or some steps for achieving the foregoing embodiments may be implemented by hardware, or may be implemented by a computer program configured to instruct related hardware. The computer program includes instructions configured to perform some or all steps of the foregoing methods, and the computer program may be stored in a readable storage medium, which may be any form of storage medium, e.g., a volatile storage medium or a non-volatile storage medium.

In addition, it should be noted that in the device and the method of the present disclosure, apparently, parts or steps may be divided and/or re-combined. The divisions and/or re-combinations should be regarded as equivalent solutions of the present disclosure. Moreover, steps of the above series of processes may be performed naturally in a time order of description. However, the performing sequence is not limited to the time order. Some steps may be performed in parallel or independently. Persons of ordinary skill in the art would appreciate that all or any steps or parts of the methods and devices of the present disclosure may be implemented in any computing device (including a processor, a storage medium and the like) or a network of computing devices in a form of hardware, firmware, software or a combination thereof, and this can be achieved by a person of ordinary skill in the art by using their basic programming skill after reading the description of the present disclosure.

Thus, the object of the present disclosure may also be implemented by running a program or a set of programs on any computing device. The computing device may be a known general purpose device. Thus, the object of the present disclosure may also be implemented merely by providing a program product which contains program code for implementing the methods or devices. That is, such program product also constitutes the present disclosure, and a storage medium in which such a program product is stored also constitutes the present disclosure. Apparently, the storage medium may be any known storage medium or any storage medium that will be developed in the future. It should also be noted that, in the devices and methods of the present disclosure, apparently, parts or steps may be divided and/or re-combined. The divisions and/or re-combinations should be regarded as equivalent solutions of the present disclosure. Moreover, steps of the foregoing series of processes may be performed naturally in a time order of description, however the performing sequence is not limited to the time order. Some steps may be performed in parallel or independently.

Some embodiments of the present disclosure further provide a computer readable storage medium storing therein a computer program, wherein the computer program is configured to be executed by a processor, to implement the following steps: receiving, by using a pre-configured first SCS, a first random access preamble message transmitted by UE when the base station instructs the UE to perform an initial access according to a contention-based random access mechanism; transmitting, by using a predetermined second SCS or a third SCS configured by a network, a first RAR message to the UE according to the first random access preamble message; receiving, by using a predetermined fourth SCS or a fifth SCS configured by a network, a first scheduling transmission message transmitted by the UE according to the first RAR message; and transmitting, by using a predetermined sixth SCS or a seventh SCS configured by the network, a first collision resolution message to the UE according to the first scheduling transmission message, so as to complete the initial access.

The predetermined second SCS is a SCS employed by a PBCH transmission, or a SCS employed by a transmission of RMSI.

The third SCS configured by the network is carried in a PRACH configuration parameter in the RMSI.

The predetermined fourth SCS is a SCS employed by a PBCH transmission, or a SCS employed by transmission of RMSI.

The fifth SCS configured by the network is carried in a PRACH configuration parameter in the RMSI, or carried in the first RAR message.

The predetermined sixth SCS is a SCS employed by a PBCH transmission, or a SCS employed by transmission of RMSI, or a SCS applied to the first RAR message.

The seventh SCS configured by the network is carried in a PRACH configuration parameter in the RMSI.

After the initial access procedure is completed, the foregoing steps further include: transmitting, by using a preconfigured eighth SCS, a first random access preamble indication message to the UE when the UL of the UE is out of sync and the base station instructs the UE to perform an random access according to a contention-free random access mechanism; receiving, by using a preconfigured ninth SCS, a second random access preamble message transmitted by the UE according to the first random access preamble indication message; and transmitting, by using a SCS applied in the transmission of the first random access preamble indication message, a second RAR message to the UE according to the second random access preamble message, so as to complete uplink synchronization.

After the initial random access procedure is completed, the foregoing steps further include: receiving, by using a preconfigured first SCS, a third random access preamble message transmitted by the UE when the UL of the UE is out of sync and the base station instructs the UE to perform an random access according to a contention-based random access mechanism; transmitting, by using a SCS applied in transmission of RMSI, a third RAR message to the UE according to the third random access preamble message; receiving, by using a SCS applied in the reception of the first scheduling transmission message, a second scheduling transmission message transmitted by the UE according to the third RAR message; and transmitting, by using a SCS applied in the transmission of the first collision resolution message, a second collision resolution message to the UE according to the second scheduling transmission message, so as to complete uplink synchronization.

Some embodiments of the present disclosure further provide a computer readable storage medium storing therein a computer program, wherein the computer program is configured to be executed by a processor, to implement the following steps: transmitting, by using a pre-configured eighth SCS, a second random access preamble indication message to the UE when the base station instructs the UE to perform an initial access according to a contention-free random access mechanism; receiving, by using a pre-configured ninth SCS, a fourth random access preamble message transmitted by the UE according to the second random access preamble indication message; and transmitting, by using a predetermined tenth SCS or an eleventh SCS configured by a network, a fourth RAR message to the UE according to the fourth random access preamble message, so as to complete the initial access.

When the contention-free random access is used in a non-handover procedure, the predetermined tenth SCS is a SCS applied to the second random access preamble indication message transmitted by a source cell.

When the contention-free random access is used in a non-handover procedure, the eleventh SCS configured by the network is carried in a PRACH configuration parameter in the second random access preamble indication message.

When the contention-free random access is used in a cell handover procedure, the predetermined tenth SCS is a SCS applied to the second random access preamble indication message transmitted by a source cell, or a SCS of a RS of a target cell that triggers the handover procedure.

When the RS in the handover procedure is a synchronization signal block reference signal, the predetermined tenth SCS is a SCS of the synchronization signal block reference signal; when the RS in the handover procedure is a CSI-RS, the predetermined tenth SCS is a SCS of the CSI-RS.

When the contention-free random access is used in a cell handover procedure, the eleventh SCS configured by the network is carried in a PRACH configuration parameter in the second random access preamble indication message.

After the initial access procedure is completed, the foregoing steps further include: transmitting, by using a preconfigured eighth SCS, a third random access preamble indication message to the UE when the UL of the UE is out of sync and the base station instructs the UE to perform an random access according to a contention-free random access mechanism; receiving, by using a preconfigured ninth SCS, a fifth random access preamble message transmitted by the UE according to the third random access preamble indication message; and transmitting, by using a SCS applied in the transmission of the third random access preamble indication message, a fifth RAR message to the UE according to the fifth random access preamble message, so as to complete uplink synchronization.

Some embodiments of the present disclosure further provide a computer readable storage medium storing therein a computer program, wherein the computer program is configured to be executed by a processor, to implement the following steps: transmitting, by using a pre-configured first SCS, a first random access preamble message to a base station when the base station instructs the UE to perform an initial access according to a contention-based random access mechanism; receiving, by using a predetermined second SCS or a third SCS configured by a network, a first RAR message transmitted by the base station according to the first random access preamble message; transmitting, by using a predetermined fourth SCS or a fifth SCS configured by a network, a first scheduling transmission message to the base station according to the first RAR message; and receiving, by using a predetermined sixth SCS or a seventh SCS configured by a network, a first collision resolution message transmitted by the base station according to the first scheduling transmission message, so as to complete the initial access.

The predetermined second SCS is a SCS employed by a PBCH transmission, or a SCS employed by a transmission of RMSI.

The third SCS configured by the network is carried in a PRACH configuration parameter in the RMSI.

The predetermined fourth SCS is a SCS employed by a PBCH transmission, or a SCS employed by transmission of RMSI.

The fifth SCS configured by a network is carried in a PRACH configuration parameter in the RMSI, or carried in the first RAR message.

The predetermined sixth SCS is a SCS employed by a PBCH transmission, a SCS employed by transmission of RMSI, or a SCS applied to the first RAR message.

The seventh SCS configured by the network is carried in a PRACH configuration parameter in the RMSI.

After the initial access procedure is completed, the foregoing steps further include: receiving, by using a preconfigured eighth SCS, a first random access preamble indication message transmitted by the base station when the UL of the UE is out of sync and the base station instructs the UE to perform an random access according to a contention-free random access mechanism; transmitting, by using a preconfigured ninth SCS, a second random access preamble message to the base station according to the first random access preamble indication message; and receiving, by using a SCS applied in the reception of the first random access preamble indication message, a second RAR message transmitted by the base station according to the second random access preamble message, so as to complete uplink synchronization.

After the initial random access procedure is completed, the foregoing steps further include: transmitting, by using a preconfigured first SCS, a third random access preamble message to the base station when the UL of the UE is out of sync and the base station instructs the UE to perform an random access according to a contention-based random access mechanism; receiving, by using a SCS applied in transmission of RMSI, a third RAR message transmitted by the base station according to the third random access preamble message; transmitting, by using a SCS applied in the transmission of the first scheduling transmission message, a second scheduling transmission message to the base station according to the third RAR message; and receiving, by using a SCS applied in the reception of the first collision resolution message, a second collision resolution message transmitted by the base station according to the second scheduling transmission message, so as to complete uplink synchronization.

Some embodiments of the present disclosure further provide a computer readable storage medium storing therein a computer program, wherein the computer program is configured to be executed by a processor, to implement the following steps: receiving, by using a pre-configured eighth SCS, a second random access preamble indication message transmitted by the base station when the base station instructs the UE to perform an initial access according to a contention-free random access mechanism; transmitting, by using a pre-configured ninth SCS, a fourth random access preamble message to the base station according to the second random access preamble indication message; and receiving, by using a predetermined tenth SCS or an eleventh SCS configured by a network, a fourth RAR message transmitted by the base station according to the fourth random access preamble message, so as to complete the initial access.

When the contention-free random access is used in a non-handover procedure, the predetermined tenth SCS is a SCS applied to the second random access preamble indication message transmitted by a source cell.

When the contention-free random access is used in a non-handover procedure, the eleventh SCS configured by the network is carried in a PRACH configuration parameter in the second random access preamble indication message.

When the contention-free random access is used in a cell handover procedure, the predetermined tenth SCS is a SCS applied to the second random access preamble indication message transmitted by a source cell, or a SCS of a RS of a target cell that triggers the handover procedure.

When the RS in the handover procedure is a synchronization signal block reference signal, the predetermined tenth SCS is a SCS of the synchronization signal block reference signal; when the RS in the handover procedure is a CSI-RS, the predetermined tenth SCS is a SCS of the CSI-RS.

When the contention-free random access is used in a cell handover procedure, the eleventh SCS configured by the network is carried in a PRACH configuration parameter in the second random access preamble indication message.

After the initial access procedure is completed, the foregoing steps further include: receiving, by using a preconfigured eighth SCS, a third random access preamble indication message transmitted by the base station when the UL of the UE is out of sync and the base station instructs the UE to perform an random access according to a contention-free random access mechanism; transmitting, by using a preconfigured ninth SCS, a fifth random access preamble message to the base station according to the third random access preamble indication message; and receiving, by using a SCS applied in the reception of the third random access preamble indication message, a fifth RAR message transmitted by the base station according to the fifth random access preamble message, so as to complete uplink synchronization.

The foregoing describes optional implementations of the present disclosure. It should be noted that for a person of ordinary skill in the art, improvements and modifications may further be made without departing from the principle of the present disclosure. These improvements and modifications should also be deemed as falling within the scope of the present disclosure.

What is claimed is:

1. A random access method, wherein the random access method is applied to a base station, and comprises:
    receiving, by using a pre-configured first SubCarrier Spacing (SCS), a first random access preamble message transmitted by a User Equipment (UE) when the base station instructs the UE to perform an initial access according to a contention-based random access mechanism;
    transmitting, by using a predetermined second SCS, a first Random Access Response (RAR) message to the UE according to the first random access preamble message, wherein the predetermined second SCS is the same as a SCS used in a transmission of ReMaining System Information (RMSI) over a Physical Downlink Control Channel (PDCCH) or Physical Downlink Shared Channel (PDSCH);
    receiving, by using a predetermined fourth SCS or a fifth SCS configured by the network, a first scheduling transmission message transmitted by the UE according to the first RAR message; and
    transmitting, by using a predetermined sixth SCS or a seventh SCS configured by the network, a first collision resolution message to the UE according to the first scheduling transmission message, to complete the initial access.

2. The random access method according to claim 1, wherein the fifth SCS configured by the network is carried in a Physical Random Access CHannel (PRACH) configuration parameter in RMSI, or carried in the first RAR message.

3. The random access method according to claim 1, wherein the predetermined sixth SCS is a SCS employed by a PBCH transmission, or a SCS employed by a transmission of RMSI, or a SCS applied to the first RAR message.

4. A random access method, wherein the random access method is applied to a UE, and comprises:
    transmitting, by using a pre-configured first SCS, a first random access preamble message to a base station when the base station instructs the UE to perform an initial access according to a contention-based random access mechanism;
    receiving, by using a predetermined second SCS, a first RAR message transmitted by the base station according to the first random access preamble message, wherein the predetermined second SCS is the same as a SCS used in a transmission of ReMaining System Information (RMSI) over a Physical Downlink Control Channel (PDCCH) or Physical Downlink Shared Channel (PDSCH);
    transmitting, by using a predetermined fourth SCS or a fifth SCS configured by a network, a first scheduling transmission message to the base station according to the first RAR message; and
    receiving, by using a predetermined sixth SCS or a seventh SCS configured by the network, a first collision resolution message transmitted by the base station according to the first scheduling transmission message, to complete the initial access.

5. The random access method according to claim 4, wherein the fifth SCS configured by the network is carried in a PRACH configuration parameter in RMSI, or carried in the first RAR message.

6. The random access method according to claim 4, the predetermined sixth SCS is a SCS employed by a PBCH transmission, or a SCS employed by a transmission of RMSI, or a SCS applied to the first RAR message.

7. A base station, comprising a first memory, a first processor and a computer program stored in the first memory and configured to be executed by the first processor, wherein the first processor is configured to execute the computer program, to implement steps of the method according to claim 1.

8. A UE, comprising: a third memory, a third processor and a computer program stored in the third memory and configured to be executed by the third processor, wherein the third processor is configured to execute the computer program, to implement steps of the method according to claim 4.

9. The UE according to claim 8, wherein the fifth SCS configured by the network is carried in a PRACH configuration parameter in RMSI, or carried in the first RAR message.

10. The UE according to claim 8, the predetermined sixth SCS is a SCS employed by a PBCH transmission, or a SCS employed by a transmission of RMSI, or a SCS applied to the first RAR message.

* * * * *